(12) United States Patent
Zumbrunnen et al.

(10) Patent No.: US 6,770,340 B2
(45) Date of Patent: Aug. 3, 2004

(54) CHAOTIC MIXING METHOD AND STRUCTURED MATERIALS FORMED THEREFROM

(75) Inventors: David A. Zumbrunnen, Seneca, SC (US); Ojin Kwon, Central, SC (US)

(73) Assignee: Clemson University, Clemson, SC (US)

( * ) Notice: Subject to any disclaimer, the term of this patent is extended or adjusted under 35 U.S.C. 154(b) by 119 days.

(21) Appl. No.: 09/963,983

(22) Filed: Sep. 25, 2001

(65) Prior Publication Data

US 2002/0053753 A1 May 9, 2002

Related U.S. Application Data

(60) Provisional application No. 60/235,469, filed on Sep. 26, 2000, now abandoned.

(51) Int. Cl.⁷ .............................. B29C 33/42; B27F 3/02
(52) U.S. Cl. ..................... 428/35.7; 264/40.1; 264/219; 264/220; 264/225; 264/255; 264/257; 264/258; 264/324; 428/543
(58) Field of Search ................................ 428/35.7, 543; 521/40, 40.5; 366/80, 81, 79, 100

(56) References Cited

U.S. PATENT DOCUMENTS

| | | |
|---|---|---|
| 3,426,754 A | 2/1969 | Bierenbaum et al. |
| 3,558,764 A | 1/1971 | Isaacson et al. |
| 3,679,538 A | 7/1972 | Druin et al. |
| 3,801,404 A | 4/1974 | Druin et al. |
| 3,801,692 A | 4/1974 | Zimmerman |
| 3,843,761 A | 10/1974 | Bierenbaum et al. |
| 4,138,459 A | 2/1979 | Brazinsky et al. |
| 4,257,997 A | 3/1981 | Soehngen et al. |
| 4,734,343 A | 3/1988 | Berthier et al. |
| 4,833,172 A | 5/1989 | Schwarz et al. |
| 5,173,235 A | 12/1992 | Kamei et al. |
| 5,551,777 A | 9/1996 | Tjahjadi et al. |
| 5,798,077 A | 8/1998 | Womer et al. |
| 5,816,698 A | 10/1998 | Durina et al. |
| 5,921,679 A | 7/1999 | Muzzio et al. |
| 6,132,076 A | * 10/2000 | Jana et al. ..................... 366/81 |

FOREIGN PATENT DOCUMENTS

WO      WO 02/26489 A1  *  4/2002

OTHER PUBLICATIONS

Zumbrunnen et al, Composites, Pt A, vol. 27A, No. 1, pp. 37–47 (1996).*

Zhang et al, AIChE Journal, vol. 42, No. 12, pp. 3301–3309 (Dec. 1996).*

Michael Ellison, David Zumbrunnen, Bridgette Gomillion and Jiong Wang—"Chaotic Mixing in Extrusion–Based Melt Spinning of Fibers" National Textile Center Annual Report: Nov. 1999 entire document.

(List continued on next page.)

*Primary Examiner*—Sandra M. Nolan
(74) *Attorney, Agent, or Firm*—Stephen R. Chapman; J B Patents. com

(57) ABSTRACT

A method for the production of a multiple phase composite material, wherein the composite material includes a major phase component and at least one minor phase component. The major and minor phase components are arranged in a desired predefined morphological structure in which the major phase component and the minor phase components have predefined size and shape characteristics. The method involves supplying the major phase component to a chaotic mixer (10) in a controlled manner and supplying the minor phase components to the chaotic mixer (10) in a controlled manner. Within the chaotic mixer (10) the major phase component and minor phase components undergo mixing according to controlled parameters to controllably and progressively develop predefined desired morphologies. Resulting structures are also provided.

39 Claims, 12 Drawing Sheets

OTHER PUBLICATIONS

Michael Ellison and David Zumbrunnen—"Chaotic Mixing in Extrusion Based Melt Spinning of Fibers"—National Textile Center Research Briefs: Apr. 1999 entire document.

Michael Ellison and David Zumbrunnen—"Chaotic Mixing in Extrusion Based Melt Spinning of Fibers" National Textile Center Research Briefs: Aug. 1998 entire document.

Michael Ellison and David Zumbrunnen—"Chaotic Mixing in Extrusion Based Melt Spinning of Fibers" National Textile center research Briefs: Mar. 1998 entire document.

Michael Ellison and David Zumbrunnen—"Chaotic Mixing in Extrusion Based Melt Spinning of Fibers" National Textile center research Briefs: Aug. 1997 entire document.

Y.H. Liu and D.A. Zumbrunnen—"Toughness Enhancement in Polymer Blends Due to the In–Situ Formation by Chaotic Mixing of Fine Scale Extended Structures" Journal of Materials Science: Apr. 1999 entire document.

D.A. Zumbrunnen, K.jC. Miles and Y.H. Liu—"Auto Processing of Very Fine–Scale Composite Materials by Chaotic Mixing of Melts" Composits Part A Vo. 27A: 1996.

Michael Ellison and David Zumbrunnen—"Chaotic Mixing in Extrusion Based Melt Spinning of Fibers" National Textile center research Briefs: Nov. 1996 entire document.

R.I. Daniescu and D.A. Zumbrunnen—"Creation of Conducting Networks Among Particle in Polymer Melts by Chaotic Mixing" Journal of Thermoplastic Composit Materials: Jul. 1998.

Y.H. Liu and D.A. Zumbrunnen—"Emergence of Fibrillar Composits Due to Chaotic Mixing of Molten Polymers" Polymer Composits, vol. 17, No. 2: Apr. 1996.

R.I. Danescu and D.A. Zumbrunnen—"Assessment of Chaotic Mixing as a Means to Produce Electrically Conducting Polymer Composites with Metallic Powders" ANTEC Conference: 1996 entire document.

R.I. Danescu and D.A. Zumbrunnen—"Computational Simulation of the In Situ Formation in Melts of Electrical Pathways Among Particles Transported by Two Dimensional Chaotic Mixing" Proceedings of ASME Heat Transfer Division vol. 4, 1998 Entire document.

R.I. Danescu and David Zumbrunnen—"Creation of Electrically Conducting Plastics by Chaotic Mixing" ANTEC Conference: 1998.

R.I. Danescu—"Chaotic Mixing as a Means to Create Electrically Conducting Networks in Plastics" Doctorial Dissertation Entire document.

Michael Ellison—"Chaos in Polymer Phase Transitions" National Textile Center Annual Report: Aug. 1995 Entire document.

Michael Ellison, Bridgette Gomillion, David Zumbrunnen and Jiong Wang—"Chaotic Mixing in Extrusion–Based Melt Spinning of Fibers" National Textile Center Annual Report: 1997 Entire document.

Michael Ellison, Bridgette Gomillion, David Zumbrunnen and Jiong Wang—"Chaotic Mixing in Extrusion–Based Melt Spinning of Fibers" National Textile Center Annual Report: Nov. 1998 Entire document.

Michael Ellison, Bridgette Gomillion, David Zumbrunnen and Jiong Wang—"Chaotic Mixing in Extrusion–Based Melt Spinning of Fibers" National Textile Center Annual Report: Nov. 1999 Entire document.

B.L. Gomillion, J. Wang, M.S. Ellison and D.A. Zumbrunnen—"Three–Dimensional Continuous Chaotic Mixing to Produce Structured Fiber Composites In–Situ" Abstract from papers for 215th ACS National Meeting Mar. 1998—Entire document.

Sadhan C. Jana, Guy Metcalfe and J.M. Ottino—"Experimental and Computational Studies of Mixing in Complex Stokes Flows: The Vortex Mixing Flow and Multicellular Cavity Flows" J. Fluid Mech. vol. 269, 1994—Entire document.

H.A. Kusch and J.M. Ottino—"Experiments on Mixing in Continuous Chaotic Flows" J. Fluid Mech. 1992 Entire document.

D.F. Zhang and D. A. Zumbrunnen—"Chaotic Mixing of Two Similiar Fluids in the Presence of a Third Dissimiliar Fluid" AIChE Journal, vol. 42, No. 12: Dec. 1996 Entire document.

K.C. Miles, B. Nagarajan and D.A. Zumbrunnen—"Three–Dimensional Chaotic Mixing of Fluids in a Cylindrical Cavity" Transactions of the ASME: Dec. 1995 Entire document.

Y.H. Liu and D.A. Zumbrunnen—"Progressive Microstructure Development by Chaotic Mixing of Liquid Crystalline Polymers and Thermoplastics and Corresponding Tensile Strengths" ANTEC Conference: 1998.

Y.H. Liu and D.A. Zumbrunnen—"Toughness Enhancement In Blends Of Dissimiliar Polymers Due to the In–Situ Formation By Chaotic Mixing Of Fine Scale Extended Structures At Low Minor Phase Concentrations" MD–vol. 80 ASME 1997—Entire Document.

D.A. Zumbrunnen and Y.H. Liu—Abstract and photomicrographs p. 202 vol. 119 Transactions of the ASME May 1997 Entire Document.

Y.H. Liu and D.A. Zumbrunnen—"Emergence of Fibrillar Composites Due To Chaotic Mixing Of Molten Polymers" ANTEC Conference 1995 Entire Document.

Yuhui Liu—"Property Enhancements Due To The In–Situ Formation Of Fine Scale Extended Structures By Chaotic Mixing Of Polymer Melts" Doctoral Dissertation Clemson University 1997.

K.C. Miles, Y.H. Liu and D.A. Zumbrunnen—"Direct Synthesis Of Very Fine–Scale Composite Materials By Chaotic Mixing Of Molten Precursors" HTD–vol. 289 Thermal Processing Of Materials: Thermo–Mechanics, Controls and Composits ASME 1994—Entire document.

D.F. Zhang and D.A. Zumbrunnen—"Chaotic Mixing of Two Similar Fluids In The Presence of A Third Dissimilar Fluid" ANTEC Conference 1996 Entire Document.

D.F. Zhang and D.A. Zumbrunnen—"Influences Of Fluidic Interfaces On The Formation Of Fine Scale Structures By Chaotic Mixing" vol. 118, Transactions of the ASME Mar. 1996 Entire Document.

D.F. Zhang and D. A. Zumbrunnen—"Influences Of Fluidic Interfaces During Formation Of Fine–Scale Composites By Chaotic Mixing Of Melts" HTD–vol. 306, ASME 1995 National Heat Transfer Conference Entire Document.

D.F. Zhang, D.A. Zumbrunnen and Y.H. Liu—"Morphology Development In Shear Flows Of Straight and Folded Molten Fibers" AICHE Journal vol. 44, Feb. 1998 Entire Document.

D. A. Zumbrunnen—"Composite Materials Evolved From Chaos" Proceedings of the 3rd Experimental Chaos Conference Aug. 21–23, 1995 Entire Document.

D.A. Zumbrunnen—"Microstructures and Physical Properties Of Composite Materials Evolved From Chaos" Proceedings of the 4th Experimental Chaos Conference Aug. 6–8, 1997 Entire Document.

David A. Zumbrunnen—"Properties and Microstructures Of Composite Materials Produced By Chaotic Mixing" vol. 14, No. 3 Composites Research Briefs 1998 Entire Document.

* cited by examiner

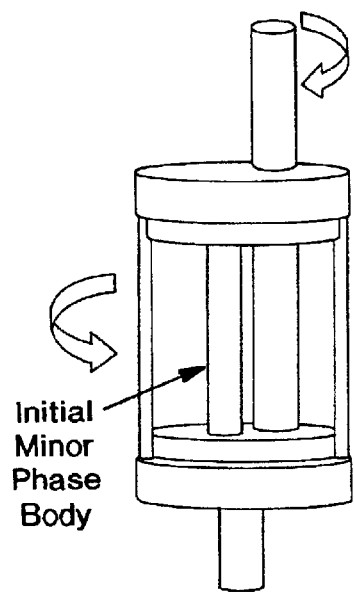 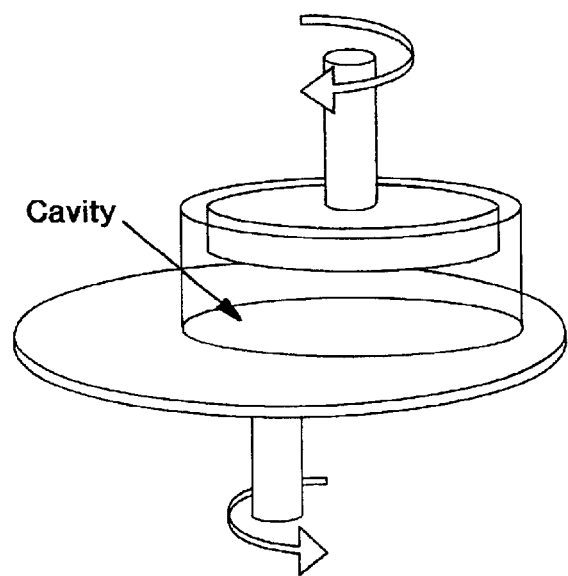
FIG. 12A
FIG. 12B

CHAOTIC MIXING METHOD AND STRUCTURED MATERIALS FORMED THEREFROM

CROSS REFERENCE TO RELATED APPLICATION

This application claims the benefit of U.S. Provisional Application No. 60/235,469 filed Sep. 26, 2000 now abandoned in the name of David A. Zumbrunnen and Ojin Kwon the contents of which are incorporated by reference herein.

BACKGROUND OF THE INVENTION

Viscous fluid(s) (e.g., polymers, plasticizers, colorants, powders, foods, etc.) are often blended with other viscous fluids and/or additives to obtain composite materials having certain desired properties. However, because of their extremely high molecular weight, polymers, for example, are intrinsically difficult to process. In fact, polymer blending has traditionally been accomplished by forcibly melting and mixing the materials together in a batch mixer or extruder, such as single-screw or twin-screw extruders.

Unfortunately, when blending polymers or other viscous fluids in a conventional manner, the morphologies (i.e., the shapes adopted by minor and major components) of the resulting composite cannot be adequately controlled. For example, when blending polymers to form a multilayered film, such as through coextrusion, it is virtually impossible to obtain a film structure that has a large number of thin layers. Some methods have been developed, such as layer stacking, to obtain multilayered films with a relatively large number of layers. However, such methods are inflexible, difficult to control, extremely complicated, and costly to utilize.

In addition to the difficulties currently encountered in forming multilayered films, similar difficulties have also arisen in forming other types of structures from a blend of viscous fluids. For example, when forming fibers from polymers within an extruder, the polymers are simultaneously sheared and melted such that the morphology of the blend often typically forms a dispersion of droplets. In order to form a fiber structure in one component, for example, the sizes of these droplets must be sufficiently large so that viscous forces acting on them can overcome interfacial tension (i.e., for capillary numbers exceeding the critical capillary number). To form such large droplets, the minor phase concentration must be high enough to promote coalescence of small droplets within the extruder.

Thus, at lower concentrations, minor component droplets do not undergo sufficient coalescence before arriving at the die entrance and thus, the small droplets cannot effectively form fibrils. Instead, in such situations, a dispersion of fine droplets is eventually obtained. On the other hand, when the concentration of the minor phase component is larger, coarser droplets and fibrils may eventually form.

In response to some of these difficulties, extruder designers have attempted to provide some control over blend morphology. For instance, extruder designers have provided limited processing flexibility by offering different screw designs, a range of shear rates, and adjustable operating temperatures. However, such design alterations and modifications are time-consuming, costly, and offer relatively no ability to selectively control blend morphology.

In addition, chaotic mixing has also been utilized to improve the blending of polymers. For example, one method for blending polymers using chaotic mixing was described, for example, in two articles entitled "Emergence of Fibrillar Composites Due to Chaotic Mixing of Molten Polymers" by Y. H. Liu and D. A. Zumbrunnen (Polymer Composites, Vol. 17, No. 2, April 1996) and "Auto-Processing of Very Fine-Scale Composite Materials by Chaotic Mixing of Melts" by D. A. Zumbrunnen, K. C. Miles, and Y. H. Liu (Composites, Part A, Vol. 27A, No. 1, 1996).

Moreover, another method, as described in "Chaotic Mixing in Extrusion-Based Melt Spinning of Fibers" by M. Ellison, D. Zumbrunnen, B. Gomillion, and Jiong Wang (National Textile Center Annual Report, http://www.ntcresearch.org, November 1998) was also developed to form fibers utilizing chaotic mixing. In particular, as shown in FIG. 1, a continuous flow chaotic mixer 110 includes a fixed outer cylinder 112 and two rotating inner cylinders 114 and 116. Two polymers can be provided to the mixer by two conventional extruders 118 and 120. Within the mixer 110, the polymers can be blended by rotation of the cylinders 114 and 116.

Nevertheless, none of the above methods have been totally successful in fully controlling polymer blending to selectively form certain coherent structures (e.g., multilayered films, fibers, interpenetrating blends, droplet dispersions, and the like) with desired characteristics, such as thin-layered, small diameter, etc.

As such, a need currently exists for an improved method of blending viscous fluids (e.g., polymers) and a method of controlling such blending to obtain certain coherent structures with desired characteristics.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which:

FIGS. 7A–7B are SEM photographs of various embodiments of interpenetrating blends formed according to the present invention, in which FIG. 7A is a depiction of a polymer blend formed from polystyrene at 35% volume and low density polyethylene at 65% volume and FIG. 7B is a depiction of a polymer blend formed from polystyrene at 65% volume and low density polyethylene at 35% volume;

FIGS. 12a and 12b are graphical illustrations representing embodiments of batch chaotic mixing devices that can be utilized in the present invention, in which FIG. 12a is a depiction of a primarily two dimensional batch chaotic mixing device and in which FIG. 12b is a depiction of a primarily three dimensional batch chaotic mixing device.

Figure 1:
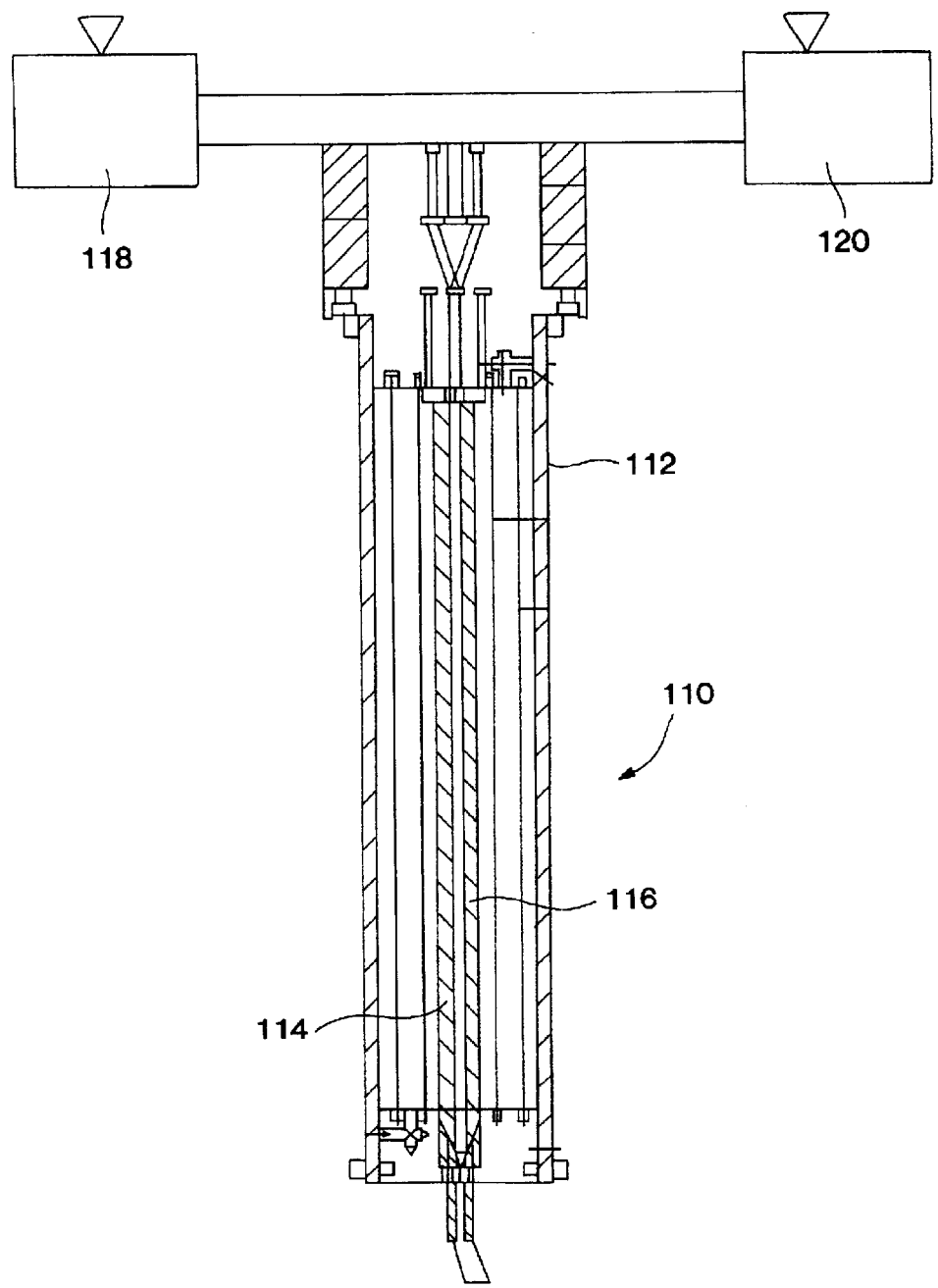
FIG. 1 is a schematic view of a prior art continuous flow chaotic mixing device.

Repeat use of reference characters in the present specification and drawings is intended to represent same or analogous features or elements of the present invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention covers such modifications and variations.

In general, the present invention is directed to a method of blending a major phase component with one or more minor phase components using chaotic mixing. In particular, it has been surprisingly discovered that by chaotically mixing two or more components in accordance with the present invention, blends having unique morphologies can be progressively and selectively formed. For example, two components can be blended in situ to form distributed multilayered film morphologies that may then be used in various applications or as a pathway for the development of other useful blend morphologies.

As used herein, the term "major phase component" refers to the component of the blend having the highest percent composition, while the term "minor phase component(s)" refers to any other components of the blend. However, it should be understood that a blend formed in accordance with the present invention may also contain components of equal compositions (e.g., 50%/50%, 25%/25%/25%/25%, etc.). In such instances, the designations used herein can be interchanged as desired so that, for example, the "major phase component" can refer to any of the materials utilized.

The major and minor phase components of the present invention may generally include any of a variety of materials. For example, in most embodiments, at least one of the components includes a viscous fluid, such as a thermoplastic polymer, thermoset polymer, ceramics (e.g., glass), etc. In one embodiment, for instance, glass can be utilized to encapsulate a material, such as a radioactive waste material. In another embodiment, two polymers can be chaotically mixed to form a polymer blend. When utilized, a polymer contained within the major and/or minor phase component(s) can generally be any polymer known in the art that is capable of being melted and mixed with another material. Some examples of polymers that may be blended in accordance with the present invention include, but are not limited to, polystyrene (e.g., atactic or isotactic polystyrene); polyethylene (e.g., low density polyethylene (LDPE) and high density polyethylene (HDPE)); polypropylene (e.g., atactic or isotactic polypropylene); various copolymers (e.g., ethylene-propylene-diene monomer ternary copolymer (EPDM), poly(ethylene-stat-vinyl acetate), ethylene vinylalcohol); and the like.

Besides a viscous fluid, the major and/or minor phase component(s) may also include other materials, such as additives, and the like. For instance, additives can be blended with a polymer to give the resulting structure certain functional attributes. In some embodiments, for example, an electrically conductive material, such as carbon black particles, can be blended with a polymer to impart conductivity properties to the resulting blend. Other examples of additives that may be blended according to the present invention include, but are not limited to, plasticizers, colorants, powders, etc.

Figure 3A:
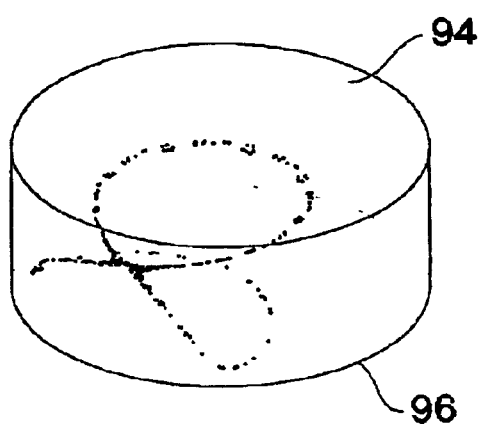
FIGS. 3A–3D are graphical illustrations representing the motion of a single particle within a melt during chaotic mixing according to one embodiment of the present invention.
Figure 3B:
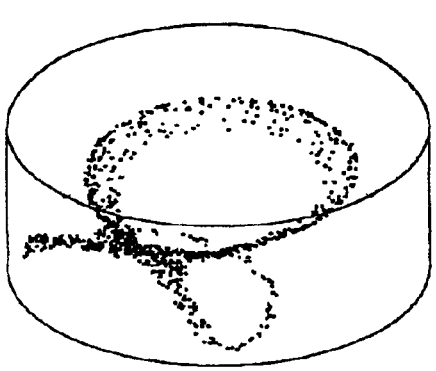
Figure 3C:
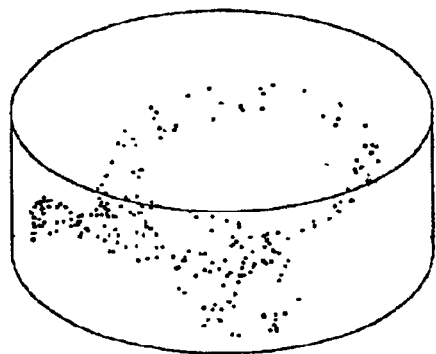
Figure 3D:
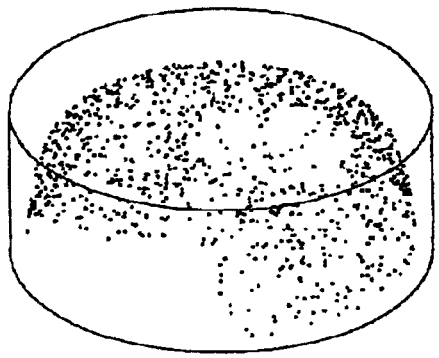

As stated, the major and minor phase components can be chaotically mixed to form a variety of blend morphologies. Chaotic mixing is a mixing process that generally allows one or more components to progressively develop into certain morphologies over a period of time. Moreover, besides allowing progressive development, chaotic mixing also allows the components to become distributed throughout a given volume. For example, referring to FIGS. 3A–3D, the transition of a particle from periodic motion to chaotic motion is illustrated generally. The paths of a single particle are shown after a pair of surface motions, which is also known to those skilled in the art as a "first-return map." For example, FIG. 3A represents the path the particle travels after successive rotational displacements of the upper bounded surface 94 and the lower bounded surface 96, while FIG. 3D represents the path the particle travels after four pair of rotation displacements that are larger in value than the first set of rotational displacements.

Figure 4:
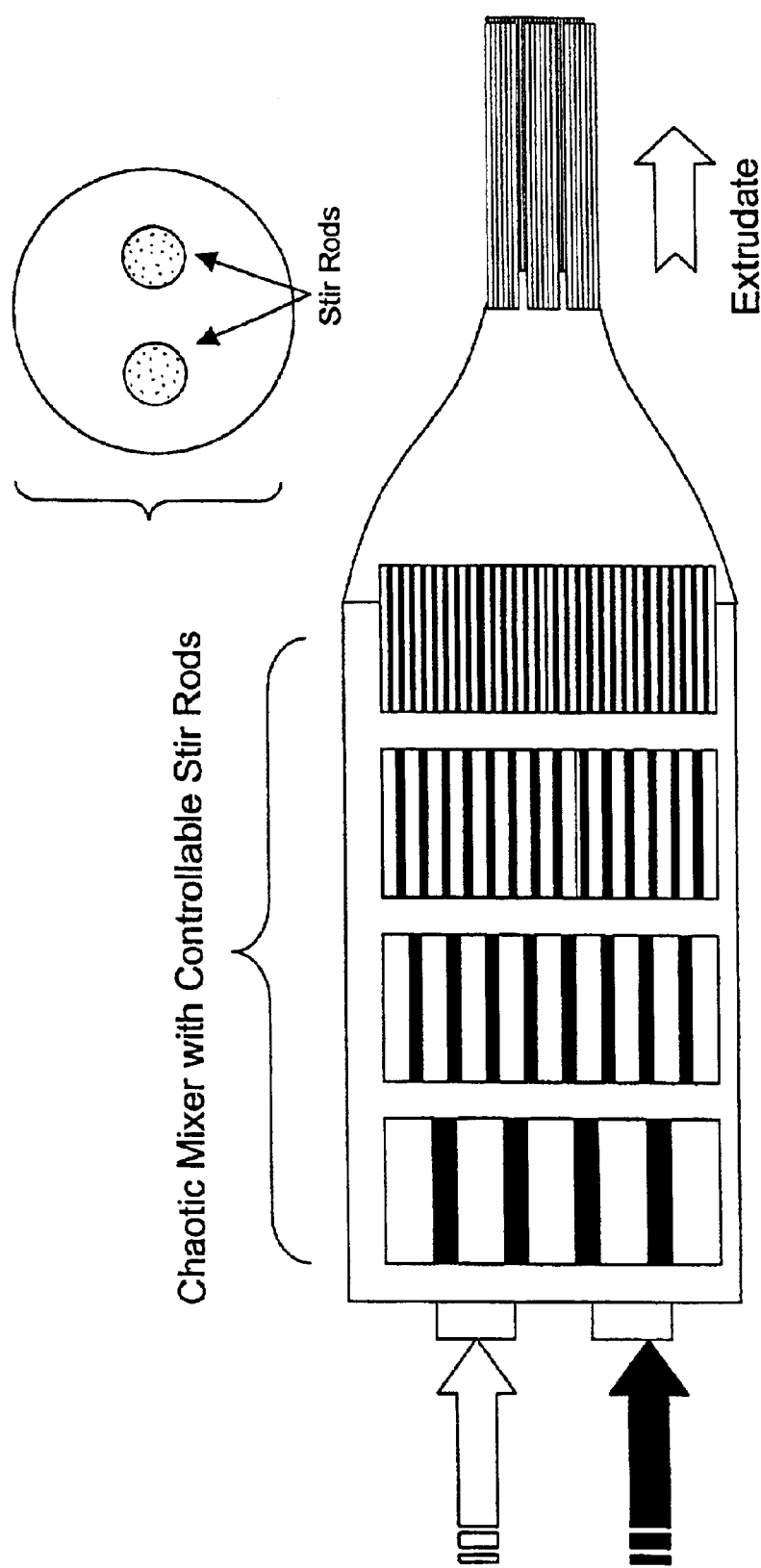
FIG. 4 is a graphical illustration of two polymer melt streams being formed into multiple layers within a chaotic mixer and extruded to form multilayer films according to one embodiment of the present invention.

As shown, the particle follows a distorted "figure-eight" path in the upper left panel for which the surface rotation displacements are small. However, as the rotational displacements become large, the path degenerates and becomes chaotic. In chaotic mixing, an initial component, such as a melted resin pellet, contains a large number of fluid elements that may undergo their own chaotic motion. The ensemble of these motions can cause recursive stretching and folding in the minor component body. An illustration of the process of recursive stretching and folding is further depicted in FIG. 4. Due to such repeated stretching and folding, striations can emerge. For example, as shown, repeated stretching and folding can allow a coarse discrete phase of a minor phase component to form a composite structure having multiple striations of the minor and major phase components.

In general, any of a variety of chaotic mixers can be utilized to blend the components in accordance with the present invention. In particular, batch, semi-batch, and continuous flow chaotic mixers may all be suitable for use in the present invention. These mixers can include one or more movable surfaces that can induce chaotic mixing. Moreover, the chaotic mixers may be designed to achieve primarily two-dimensional chaotic mixing (i.e., mixing in primarily two planes) or primarily three-dimensional chaotic mixing (i.e., mixing in primarily three planes). For example, primarily three-dimensional chaotic mixing can be induced by instilling a periodic motion in a fluid contained within a cavity. The periodic motion can be actuated by moving an upper bounding surface of a batch mixer, for example, for a predetermined time period and then moving a lower bounding surface of the batch mixer for a predetermined time period. In some instances, primarily two-dimensional chaotic mixing, on the other hand, can be actuated by rotating one or more rods within the mixer.

To achieve a polymer blend having specific characteristics, some types of chaotic mixers may sometimes be more desirable than other types. For example, in certain instances, it may be more desirable to promote fiber shapes in minor phase components by utilizing primarily three-dimensional chaotic mixing. However, it may be more desirable to form other structures, such as multilayered films and interpenetrating blends, using a continuous flow process that achieves primarily two-dimensional chaotic mixing. It should be understood, however, that no particular chaotic mixing process is required to form a polymer blend having a certain characteristic. For example, besides batch processes, continuous flow and semi-batch processes may also be used to form fibers in accordance with the present invention.

In this regard, one embodiment of a chaotic mixer that can be used in accordance with the present invention will now be described in more detail. In particular, referring to FIG. 2, one embodiment of a continuous flow chaotic mixer generally 10 that can be used in the present invention is illustrated. It should be understood that although only one chaotic mixer is illustrated and described herein, multiple chaotic mixers may be utilized in the present invention. For example, one chaotic mixer can be initially utilized to induce relatively high shear mixing in a blend. From this high shear mixer, the resulting blend can then be dispensed into a second chaotic mixer that induces relatively low shear mixing. As a result, the blend morphology can be at least partially controlled by selecting the number and type of chaotic mixers utilized.

Referring again to FIG. 2, one continuous flow chaotic mixer 10 is shown that includes a fixed outer cylinder 12, an inner cylinder 13, and two rotating stirring rods 14 and 16. Pellets of a first polymer (minor phase component), such as EPDM, are supplied to a hopper 28 that distributes the first polymer to a conventional extruder 18 for melting. Similarly, pellets of a second polymer (major phase component), such as isotactic polypropylene, are supplied to a hopper 32 that distributes the second polymer to a conventional extruder 20 for melting. In some instances, the polymers may also be initially blended within one of the extruders before being supplied to the mixer 10 for further structuring. Moreover, if desired, other polymers or materials may also be added to the mixer 10 as well. Metering pumps (not shown) may then transfer the polymer melts to the chaotic mixer 10 from their respective extruders.

As shown, the first polymer melt can be supplied to the mixer 10 via an inlet 38, while the second polymer melt can be supplied to the mixer 10 via inlets 42 & 44. In some instances, one or more of the polymer melts may be supplied to the mixer via a spinhead of a bicomponent spinning machine. In the embodiment depicted and described herein, the components are supplied to the mixer 10 at a continuous flow rate. However, it should also be understood that a continuous flow chaotic mixing process also includes embodiments in which some components may be intermittently injected into the mixer 10 during mixing, even though the components are not continuously supplied.

Once the polymer melts are fed into the outer cylinder 12 of the mixer 10, chaotic mixing can begin by the periodic rotation of the stirring rods 14 and 16. In one embodiment, for example, the stirring rod 14 can be rotated approximately 1440 degrees in the clockwise direction at a speed of about 4 revolutions per minute (rpm) and then stopped. Thereafter, the stirring rod 16 can be rotated approximately 1440 degrees in the clockwise direction at a speed of about 4 rpm and then stopped. This periodic rotation of the stirring rods can be repeated as desired to vary the extent of chaotic mixing.

Besides the features discussed above, it should be understood that the mixer 10 can include virtually any feature that would enable chaotic mixing of the components. For instance, in some embodiments, only one rotating rod may be utilized. In fact, it should be understood that the scope of the present invention is not limited to any particular mechanical feature or aspect of the mixing apparatus.

In accordance with the present invention, various aspects of the chaotic mixing process and environment can be selectively controlled to obtain a particular blend morphology. For instance, in some embodiments, the type of mixing (e.g., primarily two-dimensional or three-dimensional), the type of mixer (e.g., continuous flow, semi-batch, or batch), the number of mixers (as described above), the melt flow rate of the components, and other chaotic mixing parameters, can all be varied to obtain a morphology having certain attributes.

Referring again to FIG. 2, for example, one method of controlling certain aspects of the chaotic mixing process to obtain materials with desired characteristics is illustrated. As shown, the stirring rods 14 and 16 can be rotated by corresponding motors 64 and 66 (e.g., servo motors). The motors 64 and 66 can also be placed in communication with a controller 70 that is capable of receiving input from a programmer and sending and/or receiving signals from the chaotic mixer 10 or sensors monitoring extrudates or other resulting products. In this embodiment, a programmer can enter certain chaotic mixing parameters into the controller 70. For example, a programmer can enter the desired number of rotations for each stirring rod, the angle through which each stirring rod will be rotated, the speed at which each stirring rod will be rotated, the direction of rotation for each stirring rod, etc. Moreover, in some embodiments, other chaotic mixing parameters can also be varied, such as the radius of the outer cylinder, the radius of either stirring rod, the length of the mixing cavity, etc.

Although the chaotic mixing parameters mentioned above generally relate to a continuous flow chaotic mixer, batch and semi-batch chaotic mixers can be controlled in an analogous manner. For instance, in a batch mixer, the upper and lower bounded surfaces can be controlled in a similar manner to the method in which stirring rods of a continuous flow chaotic mixer are controlled. For example, the desired number of rotations for each bounded surface, the angle through which each bounded surface will be rotated, the speed at which each bounded surface will be rotated, the direction of rotation for each bounded surface, etc., can all be controlled.

Figure 2:
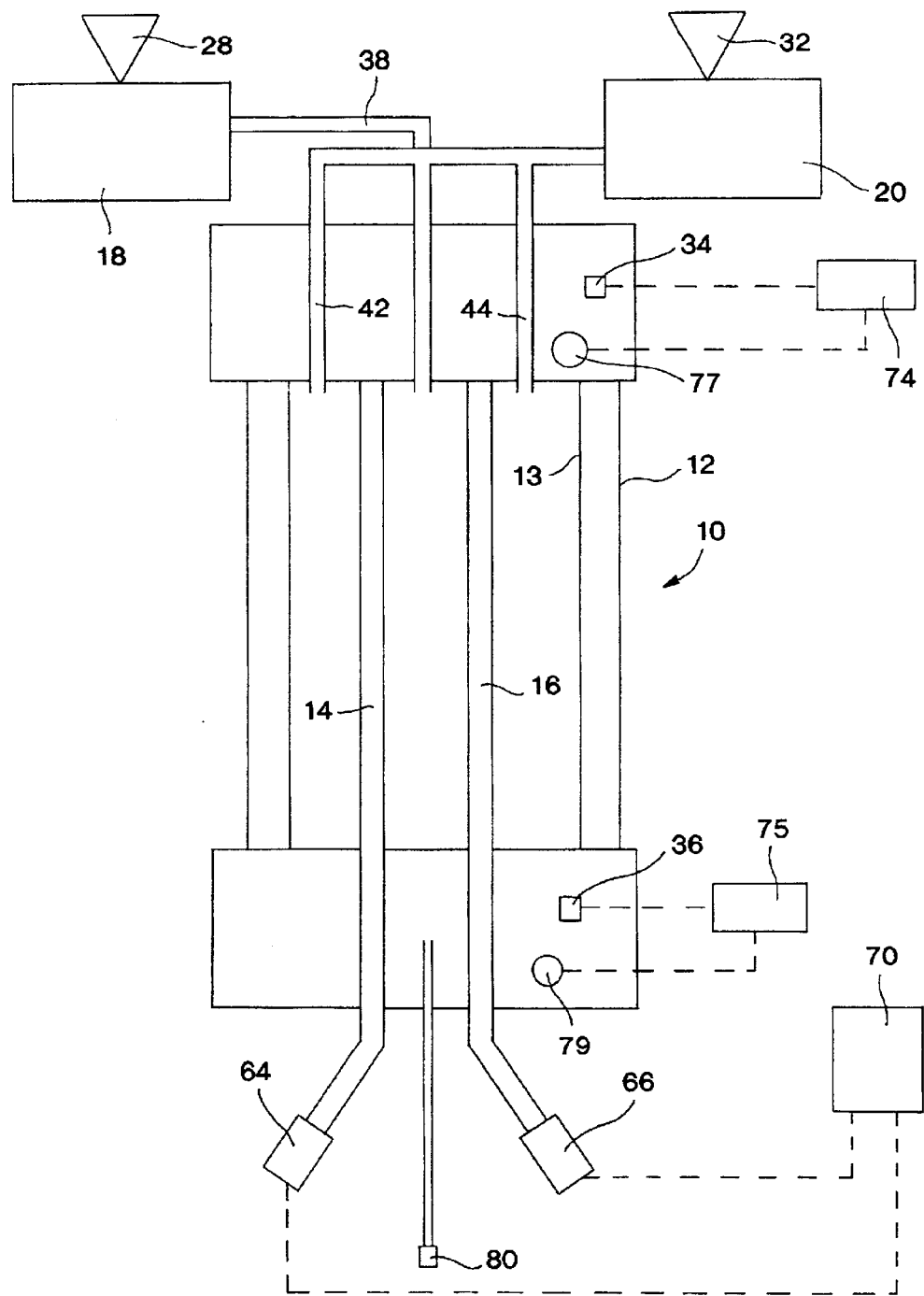
FIG. 2 is a schematic diagram of one embodiment of a continuous flow chaotic mixing device that can be utilized in accordance with the present invention.

Moreover, in some instances, various other parameters of the process may also be selectively controlled. For example, as shown in FIG. 2, the melt flow rate of the component from the first extruder 18 and/or the melt flow rate of the component from the second extruder 20 can be controlled as desired. As stated above, however, the components supplied to the mixer 10 need not be supplied at a continuous flow rate, but can also be supplied intermittently during the mixing process.

In contrast to conventional extruders in which melt flow rate and the degree of mixing are integrally related because polymer flow and mixing are both driven by screw rotation, the process of the present invention can provide independent control over both the melt flow rate and the degree of mixing. As a result of such independent control, one parameter can be selectively varied without significantly influencing the other parameter. For example, an extrudate (e.g., film, fiber, etc.) can be continuously monitored such that if a change in morphology is required, the degree of mixing can be altered (e.g., chaotic mixing parameters) without adjusting the melt flow rate.

In some embodiments, the temperature of one or more components entering or exiting the mixer can also be controlled. For example, in one embodiment, the temperature of one or more components entering or exiting the mixer 10 can be sensed by sensors 34 and 36, respectively. The sensors can relay the temperature(s) to one or more controllers, such as controllers 74 or 75, which if required, can send a signal to activate heaters 77 or 79, respectively.

In addition to the parameters mentioned above, the nature of the viscous fluids selected can also be varied to achieve a certain morphology. For example, if desired, the composition, viscosity, the number of components, etc., can all be selected to achieve a desired result. In particular, depending on the desired attributes of the resulting blend, as described in more detail below, the components used in the present invention can be selected to have either a low or high interfacial tension. As used herein, the phrase "interfacial tension" generally refers to the forces that arise between two or more fluids, such as polymer melts of different types, at the locations where they contact each other. Interfacial tension generally depends on the molecular properties of the fluids. For instance, two polymers that share a common molecular unit along their molecular chains typically have a relatively low interfacial tension. For example, two identical polymers of polyethylene have a relatively low interfacial tension (i.e., approximately zero interfacial tension). Moreover, the interfacial tension between two different types of polyethylene (e.g., low density polyethylene and high density polyethylene), for example, is also relatively low. In addition, various types of chemical additives can be combined with two or more components that typically have a relatively high interfacial tension such that the resulting blend has a relatively low interfacial tension. For example, in one embodiment, a styrene-ethylene-butylene-styrene copolymer (S-EB-S) can be added to reduce the interfacial tension between two or more polymers.

Further, various controllers and sensors may also be utilized to detect the structural development of a particular blend during chaotic mixing. In this manner, a blend having precise properties can be obtained. For instance, when forming an interpenetrating blend with electrically conductive properties, as described in more detail below, it may be desired to achieve a precise resistivity value. Thus, in accordance with the present invention, the structure and resistivity of the blend can be monitored during blend formation so that mixing is discontinued when the desired properties are achieved.

Moreover, mixing can, in some instances, be "kinematically reversed" if too much mixing has occurred before break up of the blend morphology. In one particular example, this kinematic reversibility characteristic can allow blends to be formed into structures having precise characteristics. For instance, in one embodiment, a polymer can be blended with carbon black particles to form an electrically conductive structure. If the resistivity of the electrically conductive blend drops to an undesired level due to overmixing, the mixing parameters (e.g., direction of stirring rods) can simply be reversed such that the blend becomes partially "unmixed" until a desired resistivity value is attained. The layer thicknesses of the films can be similarly adjusted. In this manner, a blending process can be selectively controlled in accordance with the present invention to achieve a blend having precise properties.

In addition to the above-mentioned parameters, it should be understood that other parameters may also be varied to achieve a particular blend morphology. In fact, the parameters mentioned above are merely examples of aspects of the chaotic mixing process that may be varied to selectively form a morphology. The present invention is not limited to any particular control aspect for selectively forming a blend during its progressive development under chaotic mixing.

Figure 5:
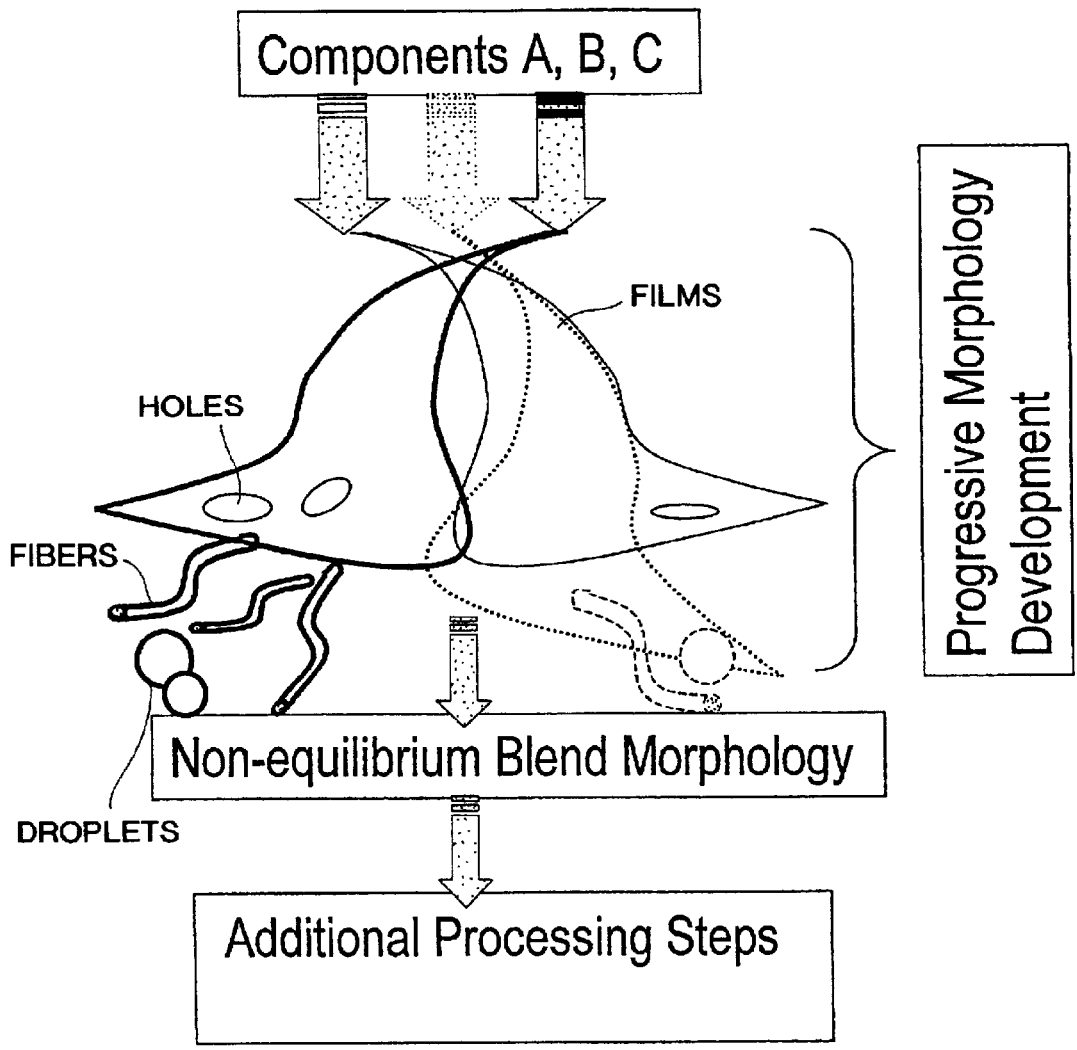
FIG. 5 is a graphical illustration of the progressive morphology development of three components into films, interpenetrating blends, fibers, and droplets.

As stated above, a blend can be allowed to progressively develop into a certain morphology by controlling certain aspects of the chaotic mixing process. For example, as shown in FIG. 5, three components can be progressively developed into films, interpenetrating blends, fibers, droplets, etc. In this regard, various examples of morphologies that can be developed in accordance with the present invention will now be described in more detail. It should be understood, however, that other morphologies not specifically mentioned herein are also contemplated to be within the scope of the present invention.

During chaotic mixing, molten components are initially stretched and folded into sheets, with smaller bodies alternately being converted into filaments. Because such sheet formation typically occurs simultaneously in the components, each region of the blend is characterized by alternating layers of components. Thus, upon further stretching and folding, a multilayer film morphology can be formed that becomes distributed in the cavity volume. In some embodiments, the multilayered film can be passed from the mixer 10 through a die 80. By passing the film through a die 80, a more uniform multilayered film structure can form. For example, because the multilayer films formed upstream of the die 80 can be physically extensive, passage through the die 80 can yield uniform extrusions with film layers or morphologies that are physically extensive at the reduced size scale of the extrudate. Additionally, gaps can sometimes form within the chaotic mixer at certain locations of the film due to incomplete mixing. By passing the film through a die 80, such gaps are compacted and minimized to result in a relatively uniform multilayered film structure.

In general, a multilayered film formed in accordance with the present invention can have a variety of different characteristics, depending on the extent and type of chaotic mixing utilized. For example, the resulting multilayered films can have any number of layers and any desired layer thickness, depending on the polymer characteristics (e.g., interfacial tension, viscosity, etc.). In fact, as described above, various chaotic mixing parameters can be selectively controlled to achieve multilayered films having various traits.

Although the multilayered films may be formed to have various characteristics, it has been discovered that certain novel and unique multilayered film microstructures can be formed utilizing chaotic mixing in accordance with the present invention. For example, the layers of the multilayered film can be remarkably thin (i.e., "nanoscale"), such as less than about 200 nanometers, particularly less than about 100 nanometers, and more particularly less than about 50 nanometers. Such nanoscale thicknesses may be achieved in a variety of ways according to the present invention.

In some embodiments, two or more components can be chaotically mixed to form films with remarkably thin layers. For example, components having certain inherent characteristics can be selected to facilitate the formation of films with thin layers. For instance, components having a relatively low interfacial tension, such as less than about 10 milliNewtons per meter (mN/m), in some embodiments less than about 4 mN/m, in some embodiments less than about 2 mN/m, and in some embodiments, less than about 1 mN/m can be utilized to form thin layers. For instance, blends such as ethylene-propylene-diene monomer ternary co-polymer & isotactic polypropylene, or other blends of a certain polymer and a copolymer thereof, can have relatively low interfacial tensions and can, in some embodiments, be utilized to form multilayered films with remarkably thin layers.

Moreover, components having a certain viscosity ratio (i.e., viscosity of minor phase component(s) divided by the viscosity of the major phase component(s)) can also be utilized to facilitate the formation of thin films. For example, components having a higher viscosity ratios are less likely to break up during mixing. Thus, typically, to form multilayered film having thin layers, viscosity ratios of greater than about 3, and in some embodiments, between about 3 to about 15, are utilized. However, it should be understood that lower viscosity ratios may be utilized as well. In particular, lower viscosity ratios can be utilized in conjunction with components having lower interfacial tension values. For example, viscosity ratios of about 0.5 may be utilized, in some instances, for components having interfacial tension values less than about 2 mN/m.

As a result of the particular selection of interfacial tension and/or viscosity ratio, the components may be capable of enduring relatively extensive stretching and folding during the chaotic mixing process without breaking apart into other structural forms. Thus, in some embodiments, the degree of mixing can also be increased to further the development of thin layers. For example, in one embodiment, the mixing period (i.e., where one period is equal to one set of stirring motions) can be greater than 5, and in some embodiments, between about 5 to about 15, to achieve films having thin layers. It should be understood, however, that lower numbers of mixing periods may also be utilized. Moreover, to increase the thickness of the layers, a smaller number of mixing periods may be utilized.

In addition, the overall shear rate of mixing can be adjusted to help provide thin layers. For example, the shear rate provided by the mixing process can be less than about 20 seconds$^{-1}$, and in some embodiments, less than about 10 second$^{-1}$. It should be understood, however, that higher shear rates may be utilized for components having higher viscosity ratios.

Figure 6:
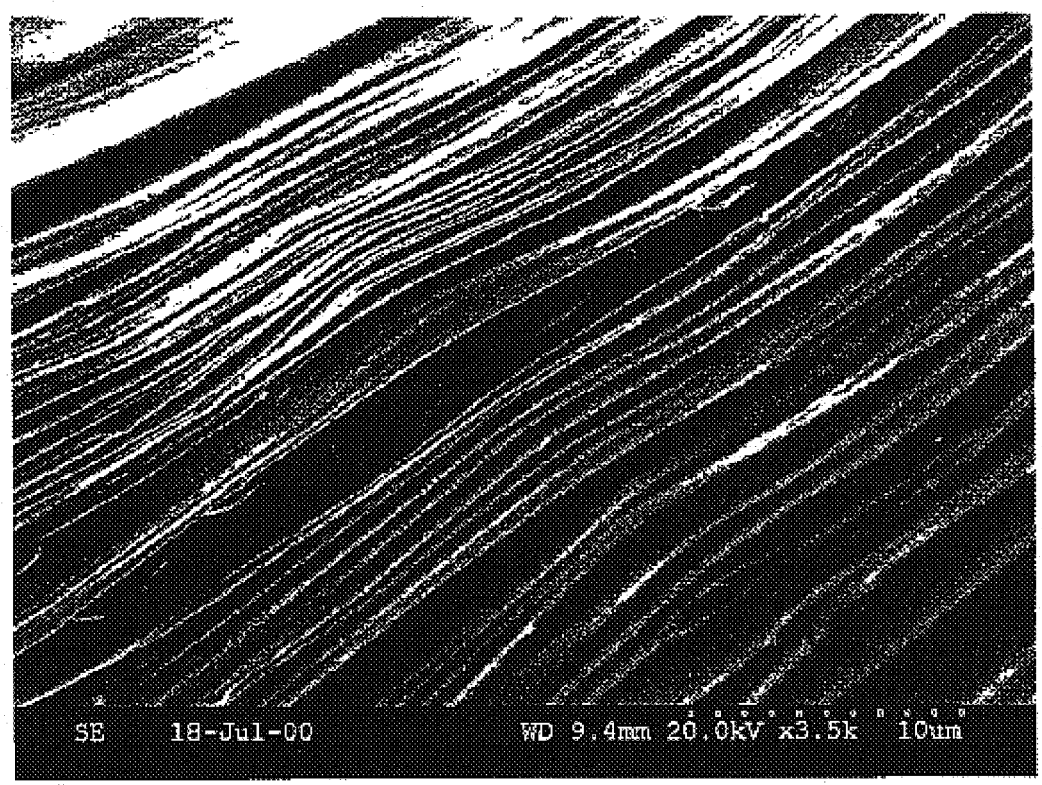
FIG. 6 is an SEM photograph of one embodiment of a multilayered film formed according to the present invention in which the blend was formed from 80% by volume polypropylene and 20% by volume ethylene-propylene-diene-monomer ternary copolymer (EPDM) and in which a cryogenic fracture surface separated the individual film layers.

As shown in FIG. 6, for example, one embodiment of a multilayered film having layer thicknesses less than about 200 nanometers is illustrated. In the depicted embodiment, EPDM (20% by volume) was blended with polypropylene (80% by volume) at a temperature of 235° C. and shear rate of below about 10/s. The polymers had a viscosity ratio (EPDM/PP) at the processing temperature of about 11, as determined by a cone-and-plate rheometer.

It should also be understood that, under certain mixing environments or with additional processing, components having a relatively high interfacial tension can also be utilized to form films. In some instances, the thicknesses of the film layers formed from components having a relatively high interfacial tension may be relatively greater than the thicknesses of the film layers formed from components having a relatively low interfacial tension. However, in some circumstances, components having a relatively high interfacial tension may nevertheless be formed into films having layers of thin thicknesses. For instance, blend morphologies developed from polymers having a relatively high interfacial tension may be further extruded to achieve layers having a smaller thickness.

In addition to having remarkably thin layer thicknesses, multilayered films formed according to the present invention can also be formed to possess other unique and novel attributes. For instance, in some embodiments, the films can be formed to have a substantial amount of layers in contrast to prior films. In particular, most conventional films produced by extrusion or co-extrusion processes contain six (6) or fewer layers.

In contrast, it has been unexpectedly discovered that distributed multilayered films formed according to the present invention can be formed to have a greater number of layers than conventional processes. For instance, multilayered films can be formed to have greater than about 10 layers and more particularly greater than about 100 layers. In some instances, the multilayered films can also be formed to have greater than about 1,000 layers, in some embodiments greater than about 4,000 layers, in some embodiments greater than about 5,000 layers, and in some embodiments, greater than about 10,000 layers without breaking apart. For example, in one embodiment, a relatively stable multilayered film can contain between about 4,500 layers to about 12,000 layers.

Due to the chaotic mixing process of the present invention, multiple layers can form within a blend without requiring arduous processing steps, such as mechanical folding and refolding. Additionally, even if a layer breaks apart, the component of the layer can be simply swept back into the blend by the forces of the chaotic mixing process to form additional film layers. Thus, a greater robustness can result in the present invention as compared to the layer degradation often associated with conventional film forming techniques, such as layer stacking techniques.

Besides the above attributes, a multilayered film formed according to the present invention can also have other unique properties. For instance, in some embodiments, as stated above, the blend layers can be formed to have relatively small thicknesses. Due to such small thicknesses, the layers are more flexible and less likely to delaminate upon formation of the multilayered film. As such, in contrast to conventional multilayered films, it is believed that a multilayered film formed according to the present invention may not require the use of any adhesive layers (i.e., "glue layers") to adhere one layer to another layer to inhibit delamination. However, it should be understood that various adhesives, as are well known in the art, may be utilized, if desired, to further enhance the adherence of the layers.

Moreover, due to the remarkably small thicknesses that are formed in situ in accordance with the present invention, additives can more readily migrate and self-assemble onto the interfaces of the film layers. Thus, for example, certain additives can be utilized to reside on the interfaces of the film layers in order to alter the properties of the overall film structure.

In addition, the remarkably small film morphologies formed according to the present invention can also be formed to possess other unique and novel attributes. For instance, in some embodiments, when components are partially or completely immiscible, a melt with an initially disoriented molecular configuration may become transformed into an oriented configuration as components become confined within fine-scale films. The molecules are forced to become aligned within the thin layers because the layers themselves are not much thicker than the molecules. In some instances, this orientation can enhance the degree of crystallinity and crystalline morphology. Such enhanced crystallinity can provide a number of benefits to the resulting morphology. For example, in barrier structures, crystalline regions are responsible for impeding diffusion of certain materials. Thus, an increased number of more physically expansive crystalline regions can provide enhanced barrier capabilities. Moreover, the crystalline regions of a structure can also alter the optical properties of the structure.

Furthermore, in some instances, the multilayered film morphologies can be formed such that the layers are relatively long and continuous. For example, bier when utilizing a continuous flow chaotic mixer, the blend layers can form such that they span substantially the entire diameter of the mixer during mixing. As such, the resulting films are relatively continuous and have a length equal to or greater than the diameter of the mixer utilized. Thus, even when such long films fragment into platelets or fibers, as described in more detail below, the fragmented pieces can also be relatively long to provide certain beneficial properties to the resulting structure, such as reinforcement materials, permeation barriers, etc.

Multilayered films of the present invention can be useful in a wide variety of applications. For instance, the films can be utilized as a light-interactive media (e.g., films for liquid crystal displays (LCDs) of computers), an acoustic dampening material, a food packaging material, a barrier material (e.g., microbial barriers, etc.), a filtration material, as well in any other application that such films may prove useful.

One particular use of films formed according to the present invention may be as porous films. For instance, porous films are commonly formed by subjecting an unstretched film to heat treatment, stretching the film at one or more temperatures to generate pores and form a porous body, and again subjecting the film to heat treatment to thermally fix the pores thus formed. Examples of some methods of producing a porous film by stretching a film and forming pores in the film is described in, for example, U.S. Pat. Nos. 3,426,754; 3,558,764; 3,679,538; 3,801,404; 3,801,692; 3,843,761; 4,138,459; 4,257,997; 4,833,172; and 5,173,235, which are incorporated herein in their entirety by reference thereto for all purposes.

These porous films may be useful in a number of applications, such as for filtration media, microbial barriers, dialysis devices, and the like. In addition, in some embodiments, as described above, the multilayered films of the present invention can be formed to have a large abundance of layers, such as greater than 4,000 layers, and/or to have layers with nanoscale thicknesses. When formed with such a large numbers of layers, the functional ability of a porous film formed therewith can be greatly improved. For instance, a porous film having 10,000 layers can be a much more effective filtration medium than a porous film having a lesser number of layers, such as only 3 layers. Moreover, a film that contains layers having a nanoscale thickness can generally be formed with pores that are nanoscale in diameter. As a result, a porous film formed therewith can become a more effective material in various applications, such as a medium for the separation of gases or for the filtration of microbes (e.g., viruses, bacteria, fungi, and the like).

As described above, two or more components may thus be chaotically mixed to obtain a multilayered film morphology. Moreover, in accordance with the present invention, this multilayered film morphology can also be allowed to progress into other morphologies, such single-phase continuous films, interpenetrating blends, platelets, fibers, droplet dispersions, and the like. For example, a multilayered film having thin layers can be utilized as a precursor to other morphologies, such as interpenetrating blends having certain novel and unique traits.

For example, in one embodiment, a multilayered film morphology may be selectively allowed to progress until holes begin to form within the film layers of one of the components to form a single-phase continuous blend. The holes within one layer can allow the components within adjacent layers to migrate through the holes and to become continuous. In particular, the degree of mixing (e.g., shear rate, mixing period, etc.) can be increased to induce the formation of such holes. Single-phase continuous films can have a variety of benefits. For example, in some instances, electrical conductors can be formed when the single phase continuity is in the conducting phase. Moreover, the film layers can also become better attached to each other to reduce delamination.

In addition, in one embodiment, a multilayered film morphology may also be selectively allowed to progress into an interpenetrating blend. The term "interpenetrating blend" generally refers to a blend of two or more components wherein at least two of the components are distributed in a manner such that they are continuous throughout the entire structure (e.g., co-continuous phases). For instance, in one embodiment, a multilayered film morphology may be selectively allowed to progress until holes begin to form within the film layers of two or more of the components to form a co-continuous blend. In particular, the degree of mixing (e.g., shear rate, mixing period, etc.) can be increased to induce the formation of such holes.

For example, when forming an interpenetrating blend, a component of one layer can pass through holes formed in the layers, as described above, such that the component becomes continuous throughout the entire structure. Moreover, when the two components are immiscible and the interfacial tension is relatively low, such a blend can generally be maintained as a coherent structure.

In the past, interpenetrating blends formed using conventional extruder technology could generally be formed at certain minor phase compositions and for certain types of polymers. In particular, co-continuous morphologies were thought to generally be governed by the following equation (1):

$$\frac{V_a \mu_b}{V_b \mu_a} \gg 1 \tag{1}$$

wherein, $V_a$ is the volume of a phase component "a", $V_b$ is the volume of a phase component "b"; and $\mu_a$ is the viscosity of the phase component "a", $\mu_b$ is the viscosity of the phase component "b".

Thus, it was believed that a co-continuous morphology could not be formed at lower minor phase compositions or for certain types of polymers. For example, a polymer blend that contained polystyrene as the minor phase component and low density polyethylene as the major phase component can have a viscosity ratio of approximately 10 (i.e., $\mu_{PS}/\mu_{LDPE} \gg 10$). As a result, it was believed that polystyrene and low density polyethylene could not be readily blended to form an interpenetrating blend because such a blend would not comply with equation (1).

In accordance with the present invention, however, it has been discovered that interpenetrating blends (i.e., co-continuous morphologies) can be formed without significant regard to the composition of the minor phase component. In particular, by selectively controlling various aspects of the chaotic mixing process, as described above, a multilayered film morphology can be allowed to progressively develop to form various types of interpenetrating blends.

Figure 7A:
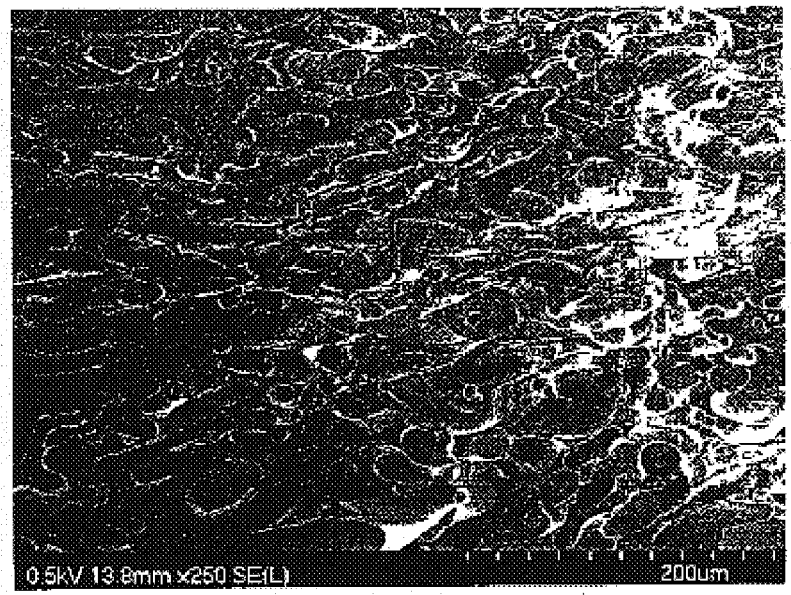
Figure 7B:
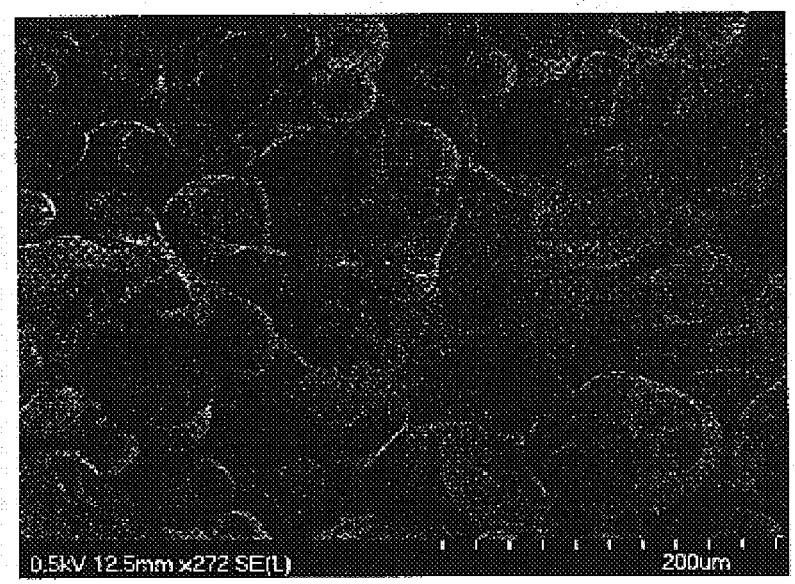
Figure 8:
FIG. 8 is an SEM photograph of one embodiment of an interpenetrating blend formed according to the present invention in which the blend was formed from 6.4% by volume low density polyethylene and 93.6% by volume polystyrene.

For instance, referring to FIGS. 7A–7B and 8, interpenetrating blend morphologies formed by chaotic mixing in accordance with the present invention are illustrated. FIG. 7A is a depiction of a polymer blend formed from polystyrene at 35% by volume and low density polyethylene at 65% by volume, while FIG. 7B is a depiction of a polymer blend formed from polystyrene at 65% by volume and low density polyethylene at 35% by volume. FIG. 8 is a depiction of a polymer blend formed from polystyrene at 6.4% by volume and low density polyethylene at 93.6% by volume. Conventionally, it was thought that such blends could not readily form interpenetrating blends.

In the embodiments depicted in FIGS. 7A–7B, primarily three-dimensional chaotic mixing was used to induce the components of the polymer melts to stretch and fold recursively about one another. However, it should be understood that primarily two-dimensional chaotic mixing, such as the embodiment depicted in FIG. 8, may also be used. In fact, in many instances, it is believed that, in some instances, two-dimensional chaotic mixing may be more desirable to form certain interpenetrating blends.

Regardless of the type of mixing, the components are typically stretched very quickly into sheets once mixing begins. Moreover, because sheet formation occurs simultaneously in both components, regions of the blend are generally characterized by alternating film layers of each component. Upon further stretching and folding, small holes begin to form within the alternating layers of the film, such as described above. As a result, a minor phase polymer, for example, within a first layer can enter through a hole in an adjacent second layer such that the minor phase polymer becomes continuous with the minor phase polymer of a third layer located adjacent to the second layer. This process can be allowed to continue until one or more of the components become continuous throughout the entire blend, such as shown in FIGS. 7A–7B and 8. In some embodiments, after forming such interpenetrating blends, they can be retained as coherent structures by solidifying the melt after an appropriate elapsed time or by extrusion.

For example, as described above, components can be initially mixed at a certain shear rate for a certain mixing period to form films. The films can have various characteristics, such as thin layers, etc. Regardless of the type of film formed, mixing can be further continued to facilitate the formation of interpenetrating blends. For example, in some embodiments, the mixing period and/or shear rate can be increased to encourage film break up. Moreover, the shear rate can be increased by controlling various chaotic mixing parameters, such as described above, or by altering the type of mixing using additional mixers (e.g., primarily three dimensional mixers).

In some embodiments, an additive can also be blended with two or more polymers to form an interpenetrating blend with a particular characteristic. For example, if desired, an electrically conductive additive, such as carbon black particles, can be chaotically mixed with polymers to form an interpenetrating blend structure that is electrically conductive.

Conventionally, a plastic was rendered electrically conductive by raising the additive concentration to a percolation threshold such that local networks formed through the random associations among particles, thereby decreasing resistivity. In contrast, extended interconnected networks can form at reduced additive compositions according to the present invention.

Moreover, in accordance with the present invention, chaotic mixing of the electrically conductive blend can be continued to alter the properties of the blend. In particular, as mixing continues, the resistance after percolation (i.e., measure of electrical conductivity) remains relatively constant. However, once mixing is continued for a certain period of time, the resistivity of the blend abruptly increases due to break up of the conducting network. At this point, the blend is again converted into a material that acts as an insulator. Thus, by appropriately controlling the degree of chaotic mixing in accordance with the present invention, blend morphologies can be selected to have various degrees of electrical conductivity. Moreover, due to the sensitivity of resistance in relation to the degree of chaotic mixing, various structures, such as high-gain sensors, can be developed from materials that have been chaotically mixed to the point that the resistance begins to abruptly increase, as described above.

In other embodiments, the electrically conductive additive can also be blended with a viscous fluid to form multilayered film extrusions with directional properties. For example, the layers of the film can be formed by alternating layers of an electrically conductive material (e.g., carbon black or an inherently conductive plastic material) and a dielectric material (e.g., a plastic or ceramic). Due to such a layered structure, electrical currents can readily flow in a direction parallel to the longitudinal layer planes. However, electric currents typically cannot flow in a direction perpendicular to the layers due to the presence of the dielectric layers. Furthermore, these layers can also be further developed using chaotic mixing to form an interpenetrating blend that allows the flow of electrical currents in all directions (i.e., isotropic electrical properties).

In addition to the morphologies described above, other morphologies may be selectively formed in accordance with the present invention. For example, in some embodiments, the multilayered films may be allowed to partially fragment to form platelets. Platelets are film pieces that are formed by the fragmentation of films. For example, increasing the degree of mixing (e.g., increasing the speed, angle of rotation, or the number of rotations of the stirring rods, or duration of the mixing process), platelets can sometimes be formed from interpenetrating blends or films. In some embodiments, when a multilayered film is formed with a substantial amount of layers, such as described above, a substantial amount of platelets may result. Such a large number of platelets or fragments can further enhance the desired properties of the platelet blend.

Platelets can provide certain desired properties, such as barrier properties, optical properties, filtration properties, and the like. For example, when platelets form from a multilayered film, various tortuous pathways (i.e., pathways having complex shapes) can develop between the platelet pieces. As such, the tortuous pathways formed by these platelets can improve the barrier properties of the film by inhibiting diffusion. Specifically, the diffusion of molecules can be inhibited because the molecules are forced to make multiple turns as they move through the blend.

In addition, other morphologies may be selectively formed in accordance with the present invention. For instance, in some embodiments, the components can be allowed to chaotically mix for a certain period of time such that at least one of the components begins to form fibers within the mixing chamber. Similar to the embodiments mentioned above, various aspects of the mixing process can be controlled to facilitate the development of a fiber morphology.

For instance, in some embodiments, a multilayered film is first formed using primarily two- or three-dimensional chaotic mixing. To form a fiber morphology within a mixer, chaotic mixing is continued until holes begin to develop within the film, as described above. As mixing continues, the holes can begin to increase in size until a mesh is formed that can be regarded as an interconnected fibrous network. Moreover, the fiber abundance can increase as the sheets are converted to thinner films. Various parameters, such as the mixing period, shear rate, etc., can be increased to cause film break up and facilitate the formation of fibers. In this manner, the abundance of long fibers can be promoted.

In some embodiments, fiber morphologies can be formed in other ways. For example, in some instances, one or more ridges can be formed into the structure of some types of film morphologies. The ridges are typically parallel to each other. As the ridges form, the troughs of the ridges continuously deepen until a certain depth is attained. At this depth, the film portions along these ridges begin to fragment and directly form fibers.

In other embodiments, a fiber morphology can be formed relatively soon after chaotic mixing begins. For example, when utilizing components with relatively high interfacial tension and/or primarily three-dimensional chaotic mixing, the film layers can begin breaking up after less fiber refinement due to the relatively complex film shapes (e.g., twisted and folded) formed.

In general, a fiber morphology formed in accordance with the present invention can have a variety of different characteristics, depending on the extent and type of chaotic mixing utilized. For example, the resulting fibers can have various lengths or diameters and can vary in number throughout the blend. In fact, as described above, various chaotic mixing parameters can be selectively controlled to promote the presence of fibers. For instance, in some embodiments, primarily three-dimensional chaotic mixing may be utilized to form a blend having a greater abundance of fibers. In particular, because three-dimensional chaotic mixing can cause films to form more complex shapes, a film morphology can be more easily fragmented into fibers.

Although the fiber morphologies may be formed to have various characteristics, it has been discovered that certain novel and unique fiber morphologies can be formed utilizing chaotic mixing in accordance with the present invention. For instance, as described above, multilayered films can be formed to have remarkably small thicknesses (e.g., less than about 200 nanometers). Moreover, fibers formed from multilayered films generally have a diameter that is approximately equal to or somewhat larger than the thickness of the film layer from which it is formed. As such, it has been discovered that fibers having remarkably small diameters can be formed in accordance with the present invention. For instance, in some embodiments, the fibers can have diameters less than about 200 nanometers, particularly less than about 100 nanometers, and more particularly less than about 50 nanometers. Further, because the fibers can be formed from films that are relatively extensive in size, as described above, fibers of increased length and abundance can be formed.

In addition to having remarkably small diameters, fiber morphologies formed according to the present invention can also be formed to possess other unique and novel attributes. For instance, in some embodiments when components are partially or completely immiscible, a melt with an initially disoriented molecular configuration may become transformed to an oriented configuration as components become confined within fine-scale fibrils. In some instances, this orientation can enhance the degree of crystallinity and crystalline morphology. Such enhanced crystallinity can provided a number of benefits to the resulting morphology. For example, in barrier structures, crystalline regions are responsible for impeding diffusion of certain materials. Thus, an increased number of more physically expansive crystalline regions can provide enhanced barrier capabilities. Moreover, the crystalline regions of a structure can also alter the optical properties of the structure.

Figure 9:
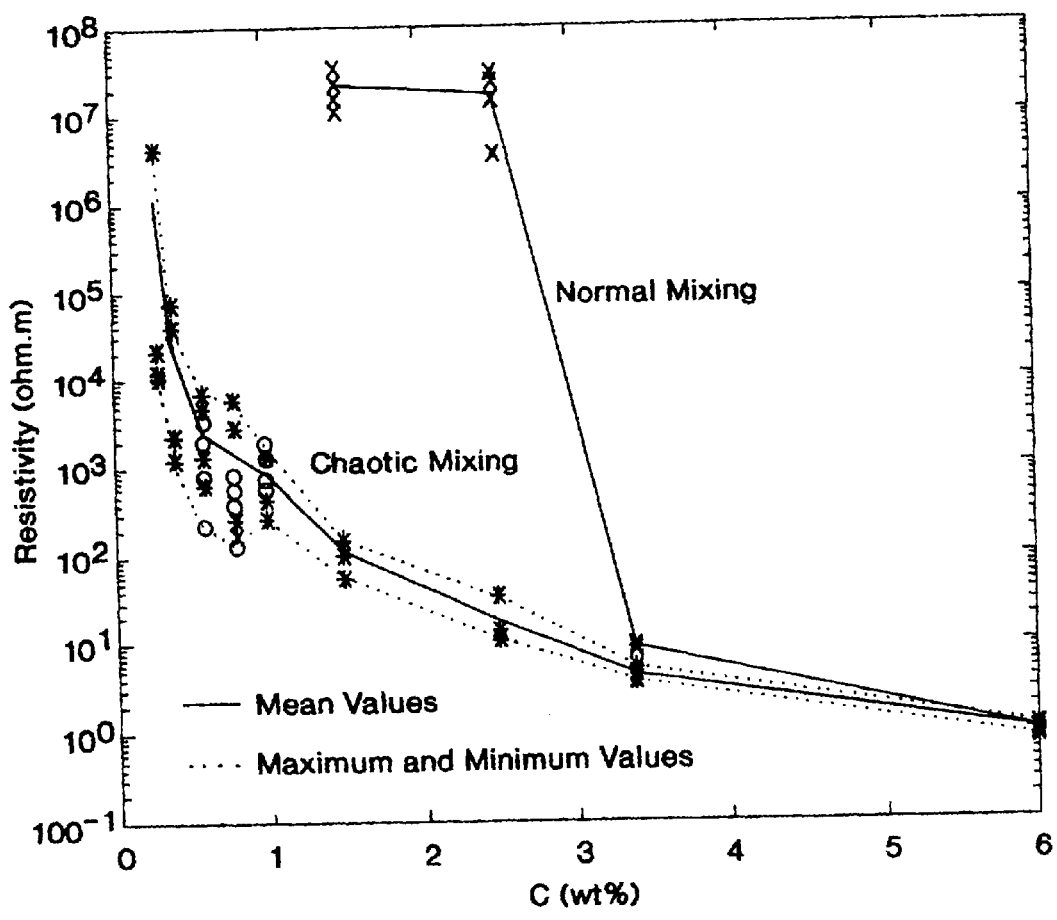
FIG. 9 is a graphical representation of resistivity (ohms x meters) versus content of carbon black (wt. % of a blend containing carbon black and polystyrene) for various embodiments of the present invention in comparison to a prior art random mixing.

Fiber morphologies can also be developed according to the present invention to have electrically conductive properties. In particular, an electrically conductive additive, such as carbon black particles, can be blended with a polymer, such as polystyrene, in a chaotic mixer. For instance, as shown in FIG. 9, a carbon black/polystyrene composite formed by chaotic mixing can begin to abruptly decrease in resistivity at concentrations of carbon black less than about 1 wt. %, while such a reduction in resistivity does not occur using conventional mixing until a carbon black concentration of approximately 3 wt. %.

The mixing process can be selectively controlled such that polymer fibers begin to form within the major phase component polymer, as described above. Moreover, various polymer combinations can also be utilized in combination with the conducting additive. For example, in one embodiment, the electrically conductive fibers can form from component combinations for which the conducting additive has an affinity for one of the components. As a result, the carbon black particles can render the fibers electrically conducting and result in a composite that is electrically conducting and mechanically reinforced.

The formation of such fiber morphologies can provide beneficial properties to a variety of composite materials. For instance, small amounts of a ductile polymer, such as polyethylene, can be blended with another polymer, such as polystyrene, for strength enhancement. However, because the polymers are immiscible, the mechanical properties resulting from conventional mixing are often unacceptable when blended using conventional techniques. In particular, conventional mixing of these polymers results in a droplet dispersion, particularly when polyethylene is present at small concentrations. Unfortunately, this morphology is inappropriate where reinforcement of a matrix is desired. Specifically, fiber-reinforced composite materials often require long, fine fibers and/or branched fibers to enable the fibers to be more resistant to separation from the matrix.

Figure 10:
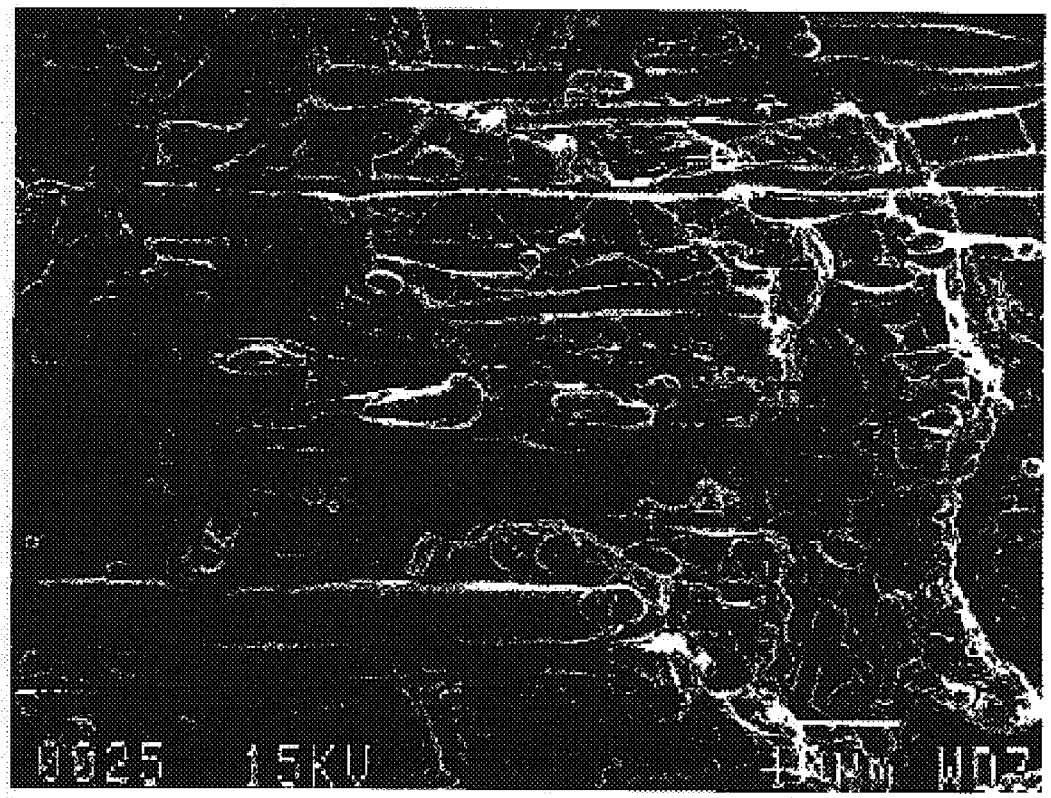
FIG. 10 is an SEM photograph of one embodiment of a fiber blend morphology of the present invention in which the blend was formed from polystyrene at 91% volume and low density polyethylene at 9% volume.

In contrast to such conventional fiber blends, a fiber blend morphology formed according to the present invention can be formed with long, fine fibers or an interconnected fibrous network that can, in some embodiments, be useful as a reinforcing material. For example, in one embodiment, as shown in FIG. 10, fibers having some interconnections formed from low density polyethylene (9% by volume) and polystyrene (91% by volume) using three-dimensional chaotic mixing without extrusion. In this embodiment, fibrils having a diameter less than about 8 micrometers ($\mu$m) were formed.

Besides the morphologies described above, droplet dispersion morphologies, which typically constitute the final developmental stage of the mixing process, may also be formed if desired. In general, droplet dispersion morphologies formed in accordance with the present invention can have a variety of different characteristics, depending on the extent and type of chaotic mixing utilized. For example, the resulting dispersions can have various diameters and can vary in number throughout the entire blend. In fact, as described above, various chaotic mixing parameters can be selectively controlled to achieve droplet dispersion morphologies having a desired trait. For instance, in some embodiments, polymers having relatively high interfacial tension can be blended to form droplets that are relatively large in diameter. In some embodiments, a blend morphology having such large diameter droplets can be effectively extended within a die to produce extrusions having internal fibers.

Although the droplet morphologies may be formed to have various characteristics, it has been discovered that certain novel and unique droplet morphologies can be formed utilizing chaotic mixing in accordance with the present invention. For instance, as described above, multi-layered films can be formed to have remarkably small thicknesses (e.g., less than about 200 nanometers). Moreover, fibers can be formed from such multilayered films to have diameters that are also remarkably small. As these fibers continue to be chaotically mixed, they eventually break up into droplets. These droplets can also have a diameter that is approximately equal to the diameter from the fibers from which they are formed. As such, it has been discovered that droplets having remarkably small diameters can be formed in accordance with the present invention. For instance, in some embodiments, the droplets can have diameters less than about 200 nanometers, particularly less than about 100 nanometers, and more particularly less than about 50 nanometers. In some instances, these droplets may be allowed to agglomerate through further mixing to produce a droplet dispersions having different characteristics.

Droplet dispersions having such remarkably small diameters can be beneficially used in a wide variety of applications. For instance, in one embodiment, a rubber component, such as synthetic or natural rubbers, can be blended with a polymer in accordance with the present invention. The components can be chaotically mixed until the rubber component breaks down into droplets, as described above. When present, rubber materials can enhance the impact absorption capabilities of the resulting polymeric structure. Moreover, as stated above, in some embodiments, the rubber component can be formed into droplets having remarkably small diameters (e.g., less than about 200 nanometers). In such instances, the small droplets can further enhance the impact absorption capabilities of the resulting polymeric structure.

Figure 11:
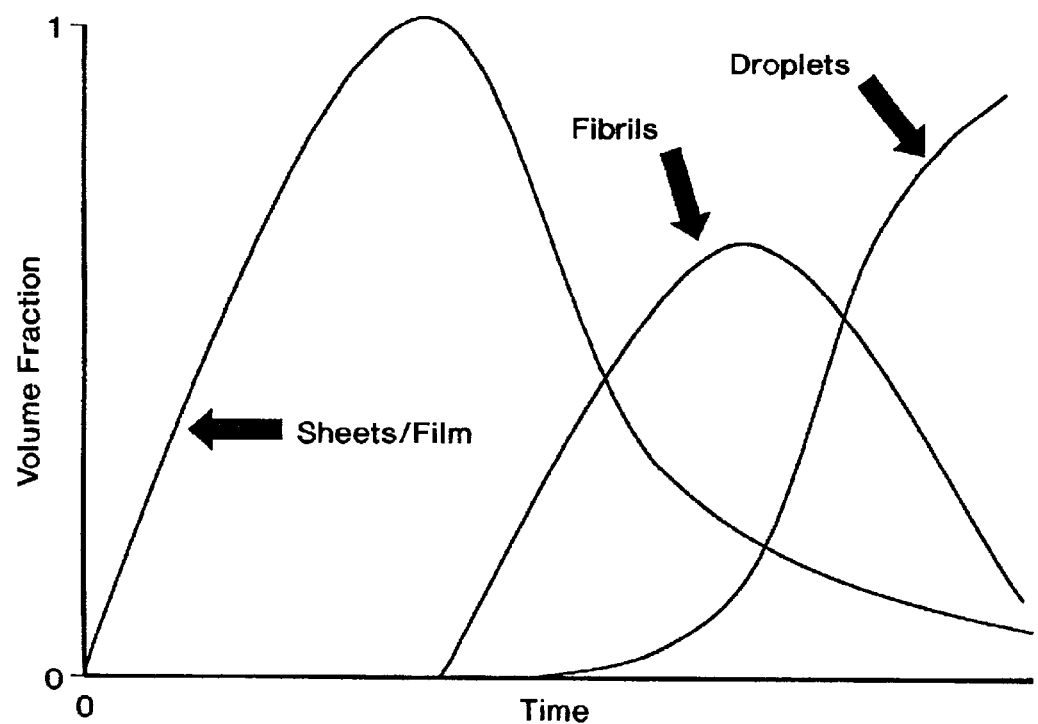
FIG. 11 is a graphical representation of the relative population of film, fibers, and droplets during chaotic mixing according to one embodiment of the present invention.

Although various blend morphologies have been described above, it should be understood that the chaotic mixing process can be controlled to selectively produce other forms and variations of morphologies not specifically described herein. In addition, it should also be understood that, in most embodiments, more than one morphology will be present in the blend at any given time. For instance, films, fibers, and droplets can all be present within a melt during progressive morphology development. Referring to FIG. 11, for example, the relative morphology abundance for a two-component melt with a minor component concentration less than about ten percent by volume can be varied. Initially, the melt streams are stretched and folded into sheets, and eventually into films. The finest films fragment into fibers with diameters approximating the film thicknesses. The fiber abundance increases as the sheets are converted to thin films, which undergo fragmentation. Fibers break up by capillary instabilities and give rise to droplets with diameters somewhat larger and smaller than the parent fiber diameter. If morphology development is permitted to proceed for long periods of time, a droplet dispersion is finally obtained.

Further, once a particular blend morphology is formed in accordance with the present invention, it may be subjected to further processing if desired. For example, the blend morphologies can be subjected to additional processing steps such as fiber spinning, injection molding, stretching, film extrusion, solidification, etc. During these post-mixing steps, further refinement, orientation, breakup, etc., may be achieved to impart certain properties to the resulting structure. For example, in some instances, films or interpenetrating blends formed in accordance with the present invention can be further extruded to form fibers.

EXAMPLE 1

The ability to selectively control a chaotic mixing process to form and extrude a multilayered film was demonstrated. A continuous flow chaotic mixer, such as shown in FIG. 2, was initially provided. The mixer had a diameter of 5.3 centimeters and a length of 75 centimeters. The mixer also contained two cylindrical stirring rods, such as described above, each having a diameter of 1.91 centimeters and a length of 75 centimeters. Each rod was offset by 1.5 centimeters from the central axis of the cylindrical mixer.

Two polymer components were also provided. In particular, a ethylene-propylene-diene monomer ternary co-polymer (EPDM) (Nordel IP NDR 3720P) and isotactic polypropylene (PP) (Montel PH723) were utilized. The viscosity ratio (viscosity of EPDM/viscosity of PP) was determined using a cone-and-plate rheometer to be about 11 at a temperature of 235° C. The polymers were supplied in amounts such that the EPDM polymer made up about 20% by volume of the blend and the polypropylene polymer made up about 80% by volume of the blend.

The polymers were then supplied to conventional extruders. In particular, the EPDM polymer was supplied to a 2.54-centimeter single screw extruder and the polypropylene polymer was supplied via separate metering pumps to a 3.18-centimeter single screw extruder. After passing through the extruders, the polymers were supplied to the chaotic mixer. The EPDM polymer was supplied to the mixer via a single port having a diameter of 0.95 centimeters and the polypropylene polymer was supplied to the mixer via six ports having diameters of 0.51 centimeters.

Within the mixer, the components were heated to a temperature of 235° C. and mixed at a shear rate less than 10 seconds$^{-1}$. Specifically, as the components entered the mixer, the first stirring rod was rotated through 1440 degrees in the clockwise direction at a speed of about 4 revolutions per minute (rpm) and then stopped. Thereafter, the second rod was rotated through 1440 degrees in the clockwise direction at a speed of about 4 rpm and then stopped. This process was repeated five (5) times until the desired level of mixing resulted.

After mixing, the polymer blend was then directed to a linear tapered circular die having a contraction length of 7.6 centimeters and a diameter of 2.5 millimeters. The resulting blend was then cooled by quenching in a water bath. An SEM photograph was then taken of the resulting morphology. The results are depicted in FIG. 6.

The resulting film morphology possessed various novel attributes. For example, as shown in FIG. 6, the EPDM film layers had thicknesses less than about 200 nanometers. Moreover, the film also contained over ten-thousand individual continuous film layers.

EXAMPLE 2

The ability to selectively control a chaotic mixing process to form an interpenetrating blend was demonstrated. A batch chaotic mixer, such as shown in FIG. 12a, was initially placed within an electric oven so that the components could be processed in a melt state at a specified temperature. As shown, the chaotic mixer contained two cylinders. The outer cylinder was formed from a "PYREX" glass tube with a radius of 23.5 millimeters. The inner cylinder was formed from stainless steel with a radius of 7.5 millimeters and a height of 12 centimeters.

Two polymer components were also provided. In particular, atactic polystyrene (PS) (GPPS 555 from Novacar Chemicals, Inc.) was provided as the major phase component, while low density polyethylene (LDPE) (Tenite 18BOA from Eastman Chemical Products, Inc.) was provided as the minor phase component. In this case, polystyrene (PS) and low density polyethylene (LDPE) had a relatively high interfacial tension such that comparatively thick layers and large breakup bodies were formed. In particular, the interfacial tension was determined to be 4.5 milliNewtons per meter (mN/m).

To begin mixing, void-free castings of the polystyrene were first formed directly within the outer cylinder. A first vertical hole having a diameter of 11.1 millimeters and a height of 12 centimeters was drilled in the casting and filled with the molten low density polyethylene component such that the volume fraction of the low density polyethylene component was 6.4% and the volume fraction of the polystyrene component was 93.6%.

After solidification, a second vertical hole was drilled to accommodate the inner cylinder of the mixer. The second vertical hole was positioned such that the central vertical axis of the second vertical hole was offset 8.6 millimeters from the central vertical axis of the outer cylinder. Once formed, the inner cylinder was placed into the hole such that a mixing cavity was formed between the cylinders having a height of 12 centimeters.

Primarily two-dimensional chaotic mixing was then induced by alternately rotating the inner and outer cylinders using an automated drive system. The ratio ("x") of the outer cylinder radius to the inner cylinder radius, the distance between the central vertical axes of the outer and inner cylinders ("y"), the number of mixing periods ("N") (i.e., where one period is equal to one set of cylinder motions), and the angular displacement for the inner and outer cylinders were each controlled to induced the desired degree of chaotic mixing. Specifically, the inner cylinder was rotated 3.8 rotations and the outer cylinder was rotated 1.2 rotations. Moreover, the following parameter values were assigned: N=10, x=3.13 and y=0.54. Further, each cylinder rotation was specified to give equal linear displacements.

The shear rates corresponded to the angular speeds of the inner and outer cylinders (<2 RPM), which ranged from 0.09 seconds$^{-1}$ to 0.21 seconds$^{-1}$ and from 0.03 seconds$^{-1}$ to 0.57 seconds$^{-1}$, respectively. Viscosities were measured with a cone-and-plate viscometer in the lower shear rate range (i.e., 0.09 seconds$^{-1}$ to 0.21 seconds$^{-1}$ range). The viscosity ratio (viscosity of LDPE/viscosity of PS) varied from 0.05 to 0.07 for the lower shear rates at a processing temperature of 180° C.

After chaotic mixing was completed, the cavity and its contents were quickly placed into a reservoir of cold water and cooled to below the glass transition temperature of PS within ten minutes. In order to elucidate the resulting morphologies obtained, 2 to 5 mm thin disk sections were cut from whole samples. These sections were immersed in toluene at room temperature to extract the PS matrix. The undissolved LDPE was then isolated using filter paper. An SEM photograph was then taken of the resulting morphology. The results are shown in FIG. 8.

As shown, the broken LDPE film layers were liberated from the PS. Inspection revealed interconnections between layer pieces of the same parent layer and also with adjacent layers. It should be noted, however, that regions also existed within the sample where films remained intact due to local differences in rates of morphology development that occurred. In some embodiments, such differences might be reduced by utilizing a continuous flow chaotic mixing device to provide a more uniform mixing rate, such as described above.

EXAMPLE 3

The ability to selectively control a chaotic mixing process to form a fiber blend from a multilayered film morphology was demonstrated. A batch chaotic mixer, such as shown in FIG. 12b, was provided. As shown, the chaotic mixer contained upper and lower discs that were rotatable by corresponding upper and lower shafts. A cylinder having a diameter ("D") of 48 millimeters was placed between the discs to form a cylindrical mixing cavity. The distance between the lower surface of the upper disc and the upper surface of the lower disc was 14.4 millimeters such that the resulting mixing cavity also had a height ("H") of 14.4 millimeters. An aspect ratio ("A") was defined as the value of H/D, which in this case, was 0.3. Moreover, the lower shaft was positioned in a manner such that it was offset a distance ("E") of 38.4 millimeters from the central vertical axis of the mixing cavity. An eccentricity value ("e") was defined as the value of 2E/D, which in this case, was 1.6.

Two polymer components were also provided. In particular, atactic polystyrene (PS) (GPPS 555 from Novacor Chemicals, Inc.) was provided as the major phase component (90% by volume), while low density polyethylene (LDPE) (Tenite 18BOA from Eastman Chemical Products, Inc.) was provided as the minor phase component (9% by volume). In this example, a compatilizer was also utilized to reduce interfacial tension between the polymers to a value of below about 4.5 mN/m. Specifically, a block copolymer of styrene-ethylene-butylene-styrene (S-EB-S) (Kraton® G1652 from Shell Chemical Co.) was utilized as a compatilizer in an amount of 1% by volume.

Initially, pellets of LDPE were frozen with liquid nitrogen and ground to reduce the pellet size. Ground pellets of 1~2 mm diameter were selected by sifting. The selected LDPE pellets were then mixed at room temperature with an S-EB-S powder by mechanical stirring in a beaker at a volume ratio of 9:1 (S-EB-S volume/PS volume). This mixture was then combined with PS pellets and mechanically mixed at a volume ratio of 1:9 (mixture volume/PS volume). The well-distributed pellets and powders were then melted in a 37 mm diameter cylinder and allowed to solidify.

A void-free cylindrical section was cut from the casting to attain the aspect ratio of 0.3 and then pressed into the mixing cavity. The cavity was mounted inside an oven and heated to 180° C. Three-dimensional chaotic mixing was then induced after one hour to ensure that a uniform melt temperature was reached. Specifically, chaotic mixing was induced by alternately rotating the upper and lower discs using an automated drive system. The number of mixing periods ("N") (i.e., where one period is equal to one set of disc motions) and the speed of rotation ("w") were controlled to induce the desired degree of chaotic mixing. Specifically, the following parameter values were assigned: N=10 and w=1 revolution per minute. Further, each cylinder was specified to give equal rotational displacement.

After chaotic mixing was performed for the prescribed interval, specimens were then solidified within a ten-minute period by directing air jets onto the cavity. The specimens were removed and fractured to expose internal structures. The results are shown in FIG. 10.

As shown, long LDPE fibers were formed. Moreover, due to the low adhesion between the immiscible LDPE and PS, some LDPE fibers separated and only their imprints remained evident. In addition, because fibers eventually subdivided into droplets due to capillary instabilities, droplets were also intermingled with the fibers. The fibers were also intermingled with film layers in some locations as a result of being formed from film breakup.

As stated, the resulting fibrous morphology contained long fibers that could serve as internal reinforcements. For example, the sample had an impact toughness 69% higher than a sample of pure PS and a peak impact stress 24% higher than the pure PS. The fibers shown in FIG. 10 can also be further elongated and oriented upon extrusion.

Although various embodiments of the invention have been described using specific terms, devices, and methods, such description is for illustrative purposes only. The words used are words of description rather than of limitation. It is to be understood that changes and variations may be made by those of ordinary skill in the art without departing from the spirit or scope of the present invention. In addition, it should be understood that aspects of the various embodiments may be interchanged both in whole or in part. Therefore, the spirit and scope of the present invention should not be limited to the description of the preferred versions contained therein.

What is claimed is:

1. A method for the production of a multiphase composite material, wherein the composite material comprises a major phase component and at least one minor phase component arranged in a desired predefined morphological structure in which said major phase component and said at least one minor phase component have predefined size and shape characteristics the method comprising the steps of:

supplying said major phase component to a chaotic mixer in a substantially continuous manner;

supplying said at least one minor phase component to said chaotic mixer in a substantially continuous manner;

chaotically mixing said major phase component with said at least one minor phase component within said chaotic mixer according to controlled mixing parameters such that said major phase component and said at least one minor phase component form an in-situ structured arrangement of predetermined and controllable morphology within said chaotic mixer and wherein at least one of the group consisting of said major phase component and said at least one minor phase component is in a substantially liquid state during mixing, and further, wherein the chaotically mixing step comprises a plurality of substantially discrete, controllable mixing stages of differing functionality to produce predetermined staged morphological changes with in the group consisting of said major phase component and said at least one minor phase component, and still further, wherein the controlling step includes selectively varying the shear rate in the chaotic mixer during the chaotically mixing step;

continuously discharging said in-situ structured arrangement from the chaotic mixer in the form of a structured extrudate of controllable morphological character;

controlling the chaotic mixing step to controllably and progressively develop the morphologies of said major phase component and said at least one minor phase component within said structured extrudate; and controllably forming said structured extrudate into a substantially solid construction having said predefined morphological structure.

2. A method for the production of a multiphase composite material, wherein the composite material comprises a major phase component and at least one minor phase component arranged in a desired predefined morphological structure in which said major phase component and said at least one minor phase component have predefined size and shape characteristics the method comprising the steps of:

supplying said major phase component to a chaotic mixer in a substantially continuous manner;

supplying said at least one minor phase component to said chaotic mixer in a substantially continuous manner;

chaotically mixing said major phase component with said at least one minor phase component within said chaotic mixer according to controlled mixing parameters such that said major phase component and said at least one minor phase component form an in-situ structured arrangement of predetermined and controllable morphology within said chaotic mixer and wherein at least one of the group consisting of said major phase component and said at least one minor phase component is in a substantially liquid state during mixing, and further, wherein the chaotically mixing step comprises a plurality of substantially discrete, controllable mixing stages of differing functionality to produce predetermined staged morphological changes with in the group consisting of said major phase component and said at least one minor phase component, and still further, wherein the controlling step includes reversing the direction of mixing during the chaotically mixing step;

continuously discharging said in-situ structured arrangement from the chaotic mixer in the form of a structured extrudate of controllable morphological character;

controlling the chaotic mixing step to controllably and progressively develop the morphologies of said major phase component and said at least one minor phase component within said structured extrudate; and controllably forming said structured extrudate into a substantially solid construction having said predefined morphological structure.

3. A method for the production of a multiphase composite material, wherein the composite material comprises a major phase component and at least one minor phase component arranged in a desired predefined morphological structure in which said major phase component and said at least one minor phase component have predefined size and shape characteristics, the method comprising the steps of:

supplying said major phase component to a chaotic mixer in a substantially continuous manner;

supplying said at least one minor phase component to said chaotic mixer in a substantially continuous manner;

chaotically mixing said major phase component with said at least one minor phase component within said chaotic mixer according to controlled mixing parameters such that said major phase component and said at least one minor phase component form an in-situ structured arrangement of predetermined and controllable morphology within said chaotic mixer and wherein at least one of the group consisting of said major phase component and said at least one minor phase component is in a substantially liquid state during mixing, and further, wherein said at least one minor phase component comprises a substantially solid phase material which remains in a substantially unmelted state within said chaotic mixer and said major phase component comprises a polymeric material which is in a substantially liquid state within said chaotic mixer;

continuously discharging said in-situ structured arrangement from the chaotic mixer in the form of a structured extrudate of controllable morphological character;

controlling the chaotic mixing step to controllably and progressively develop the morphologies of said major phase component and said at least one minor phase component within said structured extrudate; and controllably forming said structured extrudate into a substantially solid construction having said predefined morphological structure.

4. A method for the production of a multiphase composite material, wherein the composite material comprises a major phase component and at least one minor phase component arranged in a desired predefined morphological structure in which said major phase component and said at least one minor phase component have predefined size and shape characteristics, the method comprising the steps of:

supplying said major phase component to a chaotic mixer in a substantially continuous manner;

supplying said at least one minor phase component to said chaotic mixer in a substantially continuous manner;

chaotically mixing said major phase component with said at least one minor phase component within said chaotic mixer according to controlled mixing parameters such that said major phase component and said at least one minor phase component form an in-situ structured arrangement of predetermined and controllable morphology within said chaotic mixer and wherein at least one of the group consisting of said major phase component and said at least one minor phase component is in a substantially liquid state during mixing, and further, wherein said major phase component comprises a substantially solid phase material which remains in a substantially unmelted state within said chaotic mixer and said at least one minor phase component comprises a polymeric material which is in a substantially liquid state within said chaotic mixer;

continuously discharging said in-situ structured arrangement from the chaotic mixer in the form of a structured extrudate of controllable morphological character;

controlling the chaotic mixing step to controllably and progressively develop the morphologies of said major phase component and said at least one minor phase component within said structured extrudate; and controllably forming said structured extrudate into a substantially solid construction having said predefined morphological structure.

5. A method for the manufacture of a multiple phase composite construction having a major phase component and at least one minor phase component arranged in a desired predefined morphological structure comprising a plurality of substantially discrete layers with holes of predetermined size extending through one or more of said substantially discrete layers, the method comprising the steps of:

supplying said major phase component to a chaotic mixer in a substantially controlled manner;

supplying said at least one minor phase component to said chaotic mixer in a substantially controlled manner;

chaotically mixing said major phase component with said at least one minor phase component within said chaotic mixer such that said major phase component and said at least one minor phase component form an in-situ structured arrangement of structured morphology developed progressively within said chaotic mixer according to a pre-established controllable evolutionary process such that at a preliminary stage of said chaotic mixing said in-situ structured arrangement comprises a plurality of substantially continuous layers of said major phase component and said at least one minor phase component disposed in substantially layered relation to one another and wherein upon further chaotic mixing said substantially continuous layers undergo progressive thinning and subsequent morphological transition towards layers with holes of increasing dimension; and controlling the chaotically mixing step such that the chaotic mixing is terminated at a controlled stage following formation of said substantially continuous layers and during morphological transition away from said substantially continuous layers such that said major phase component and said at least one minor phase component comprise a plurality of substantially discrete extended layers of predetermined size and shape of said major phase component and said at least one minor phase component wherein at least a portion of said substantially discrete extended layers includes a plurality of holes of predetermined size, and further, wherein during the chaotically mixing steps the viscosity of said at least one minor phase component divided by the viscosity of said major phase component is in the range 0.5 to 15;

discharging said in-situ structured arrangement from said chaotic mixer in the form of a structured extrudate; and controllably forming said structured extrudate into a substantially solid construction having predefined morphological structure.

6. A method for the manufacture of a multiple phase composite construction having a major phase component and at least one minor phase component arranged in a desired predefined morphological structure comprising a plurality of substantially discrete layers with holes of predetermined size extending through one or more of said substantially discrete layers, the method comprising the steps of:

supplying said major phase component to a chaotic mixer in a substantially controlled manner;

supplying said at least one minor phase component to said chaotic mixer in a substantially controlled manner;

chaotically mixing said major phase component with said at least one minor phase component within said chaotic mixer such that said major phase component and said at least one minor phase component form an in-situ structured arrangement of structured morphology developed progressively within said chaotic mixer according to a pre-established controllable evolutionary process such that at a preliminary stage of said chaotic mixing, said in-situ structured arrangement comprises a plurality of substantially continuous layers of said major phase component and said at least one minor phase component disposed in substantially layered relation to one another and wherein upon further chaotic mixing said substantially continuous layers undergo progressive thinning and subsequent morphological transition towards layers with holes of increasing dimension; and controlling the chaotically mixing step such that the chaotic mixing is terminated at a controlled stage following formation of said substantially continuous layers and during morphological transition away from said substantially continuous layers such that said major phase component and said at least one minor phase component comprise a plurality of substantially discrete extended layers of predetermined size and shape of said major phase component and said at least one minor phase component wherein at least a portion of said substantially discrete extended layers includes a plurality of holes of predetermined size, and further, wherein said at least one minor phase component comprises a substantially solid phase material which remains in a substantially unmelted state within said chaotic mixer and said major phase component comprises a polymeric material which is in a substantially liquid state within said chaotic mixer;

discharging said in-situ structured arrangement from said chaotic mixer in the form of a structured extrudate; and controllably forming said structured extrudate into a substantially solid construction having predefined morphological structure.

7. A method for the manufacture of a multiple phase composite construction having a major phase component and at least one minor phase component arranged in a desired predefined morphological structure comprising a plurality of substantially discrete layers with holes of predetermined size extending through one or more of said substantially discrete layers the method comprising the steps of:

supplying said major phase component to a chaotic mixer in a substantially controlled manner;

supplying said at least one minor phase component to said chaotic mixer in a substantially controlled manner;

chaotically mixing said major phase component with said at least one minor phase component within said chaotic mixer such that said major phase component and said at least one minor phase component form an in-situ structured arrangement of structured morphology developed progressively within said chaotic mixer according to a pre-established controllable evolutionary process such that at a preliminary state of said chaotic mixing, said in-situ structured arrangement comprises a plurality of substantially continuous layers of said major phase component and said at least one minor phase component disposed in substantially layered relation to one another and wherein upon further chaotic mixing said substantially continuous layers undergo progressive thinning and subsequent morphological transition towards layers with holes of increasing dimension;

controlling the chaotically mixing step such that the chaotic mixing is terminated at a controlled stage following formation of said substantially continuous layers and during morphological transition away from said substantially continuous layers such that said major phase component and said at least one minor phase component comprise a plurality of substantially discrete extended layers of predetermined size and shape of said major phase component and said at least one minor phase component wherein at least a portion of said substantially discrete extended layers includes a plurality of holes of predetermined size and further wherein said major phase component comprises a substantially solid phase material which remains in a substantially unmelted state within said chaotic mixer and said at least one minor phase component comprises a polymeric material which is in a substantially liquid state within said chaotic mixer;

discharging said in-situ structured arrangement from said chaotic mixer in the form of a structured extrudate; and controllably forming said structured extrudate into a substantially solid construction having predefined morphological structure.

8. A method for the manufacture of a multiple phase composite construction having a major phase component and at least one minor phase component arranged in a desired predefined morphological structure comprising a plurality of substantially discrete layers with holes of predetermined size extending through one or more of said substantially discrete layers, the method comprising the steps of:

supplying said major phase component to a chaotic mixer in a substantially controlled manner;

supplying said at least one minor phase component to said chaotic mixer in a substantially controlled manner;

chaotically mixing said major phase component with said at least one minor phase component within said chaotic mixer such that said major phase component and said at least one minor phase component form an in-situ structured arrangement of structured morphology developed progressively within said chaotic mixer according to a pre-established controllable evolutionary process such that at a preliminary state of said chaotic mixing, said in-situ structured arrangement comprises a plurality of substantially continuous layers of said major phase component and said at least one minor phase component disposed in substantially layered relation to one another and wherein upon further chaotic mixing said substantially continuous layers undergo progressive thinning and subsequent morphological transition towards layers with holes of increasing dimension and further, wherein at least one of the group consisting of said major phase component and said at least one minor phase component includes an interfacial tension reducing additive;

controlling the chaotically mixing step such that the chaotic mixing is terminated at a controlled stage following formation of said substantially continuous layers and during morphological transition away from said substantially continuous layers such that said major phase component and said at least one minor phase component comprise a plurality of substantially discrete extended layers of predetermined size and shape of said major phase component and said at least one minor phase component wherein at least a portion of said substantially discrete extended layers includes a plurality of holes of predetermined size;

discharging said in-situ structured arrangement from said chaotic mixer in the form of a structured extrudate; and controllably forming said structured extrudate into a substantially solid construction having predefined morphological structure.

9. A method for the manufacture of a multiple phase component arranged in a desired predefined morphological structure comprising a plurality of substantially discrete layers with holes of predetermined size extending through one or more of said substantially discrete layers, the method comprising the steps of:

supplying said major phase component to a chaotic mixer in a substantially controlled mariner, supplying said at least one minor phase component to said chaotic mixer in a substantially controlled manner;

chaotically mixing said major phase component with said at least one minor phase component within said chaotic mixer such that said major phase component and said at least one minor phase component form an in-situ structured arrangement of structured morphology developed progressively within said chaotic mixer according to a pre-established controllable evolutionary process such that at a preliminary stage of said chaotic mixing, said in-situ structured arrangement comprises a plurality of substantially continuous layers of said major phase component and said at least one minor phase component disposed in substantially layered relation to one another and wherein upon further chaotic mixing said substantially continuous layers undergo progressive thinning and subsequent morphological transition towards layers with holes of increasing dimension and further wherein said major phase component is electrically conductive and said at least one minor phase component is substantially electrically non-conductive;

controlling the chaotically mixing step such that the chaotic mixing is terminated at a controlled stage following formation of said substantially continuous layers and during morphological transition away from said substantially continuous layers such that said major phase component and said at least one minor phase component comprise a plurality of substantially discrete extended layers of predetermined size and shape of said major phase component and said at least one minor phase component wherein at least a portion of said substantially discrete extended layers includes a plurality of holes of predetermined size;

discharging said in-situ structured arrangement from said chaotic mixer in the form of a structured extrudate; and controllably forming said structured extrudate into a substantially solid construction having predefined morphological structure.

10. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component, wherein at least one of the group consisting of said major phase component and said at least one minor phase component comprises a substantially solid phase material which remains substantially unmelted during said chaotically mixing step;

controlling the chaotic mixing steps such that the chaotic mixing is terminated at a controlled stage of interpenetration of said major phase component and said at least one minor phase component;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

11. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component, and wherein at least one of the group consisting of said major phase component and said at least one minor phase component comprises a substantially solid phase material which remains substantially unmelted during said chaotically mixing step and further, wherein said substantially solid phase material is electrically conductive;

controlling the chaotic mixing steps such that the chaotic mixing is terminated at a controlled stage of interpenetration of said major phase component and said at least one minor phase component;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

12. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component;

controlling the chaotic mixing steps such that the chaotic mixing is terminated at a controlled stage of interpenetration of said major phase component and said at least one minor phase component and further, wherein the chaotically mixing step comprises a plurality of substantially discrete controllable mixing stages of differing functionality to produce predetermined staged morphology changes within the group consisting of said major phase component and said at least one minor phase component and still further, wherein the controlling steps include selectively varying the shear rate in the chaotic mixer at different stages during the chaotically mixing step discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

13. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component;

controlling the chaotic mixing steps such that the chaotic mixing is terminated at a controlled stage of interpenetration of said major phase component and said at least one minor phase component and further, wherein the chaotically mixing step comprises a plurality of substantially discrete controllable mixing stages of differing functionality to produce predetermined staged morphology changes within the group consisting of said major phase component and said at least one minor phase component and still further wherein the controlling steps include utilizing a selective combination of two dimensional chaotic mixing and three dimensional chaotic mixing during the chaotically mixing step;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

14. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component;

controlling the chaotic mixing steps such that the chaotic mixing is terminated at a controlled stage of interpenetration of said major phase component and said at least one minor phase component and further, wherein the chaotically mixing step comprises a plurality of substantially discrete controllable mixing stages of differing functionality to produce predetermined staged morphology changes within the group consisting of said major phase component and said at least one minor phase component and still further, wherein the controlling steps include reversing the direction of mixing during the chaotically mixing step whereby structural development is at least partially reversed such that the interpenetration between said major phase component and said at least one minor phase component is reduced;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

15. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component and further, wherein said major phase component is substantially electrically conductive and said at least one minor phase component is electrically nonconductive;

controlling the chaotic mixing steps such that the chaotic mixing is terminated at a controlled stage of interpenetration of said major phase component and said at least one minor phase component;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

16. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component and further, wherein said major phase component is substantially electrically nonconductive and said at least one minor phase component is electrically conductive, and in addition wherein said major phase component is a plastic and said at least one minor phase component is electrically conductive and finally, electrical conductivity of said multiphase construction initially decreases to a predefined limit during the chaotic mixing step as said major phase component and said at least one minor phase component undergo interpenetration, and wherein electrical resistivity thereafter undergoes a subsequent rapid increase so as to approach a substantially insulating character upon further chaotic mixing and wherein during the controlling step the chaotic mixing step is terminated at a stage resulting in a desired level of electrical resistivity;

controlling the chaotic mixing steps such that the chaotic mixing is terminated at a controlled stage of interpenetration of said major phase component and said at least one minor phase component;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

17. A method for the manufacture of a multiple phase composite construction having a major phase component and at least one minor phase component wherein said major phase component and said at least one minor phase component are in interpenetrating blended relation with one another, the method comprising the steps of:

supplying said major phase component to a chaotic mixer in a substantially controlled manner;

supply said at least one minor phase component to said chaotic mixed in a substantially controlled manner;

chaotically mixing said major phase component with said at least one minor phase component within said chaotic mixer such that said major phase component and said at least one minor phase component form an in-situ structured arrangement comprising an interpenetrating blend of said major phase component and said at least one minor phase component and further wherein said major phase component is substantially electrically nonconductive and said at least one minor phase component is electrically conductive, and in addition wherein said major phase component is a plastic and said at least one minor phase component is an electrically conductive additive, and finally wherein electrical resistivity of said multiple phase construction initially decreases to a predefined limit during the chaotically mixing step as said major phase component and said at least one minor phase component undergo interpenetration, and wherein electrical resistivity thereafter undergoes a subsequent rapid increase so as to approach a substantially insulating character upon further chaotic mixing and wherein during the controlling step the chaotically mixing step is terminated at a stage resulting in a desired level of electrical resistivity;

controlling the chaotic mixing steps such that the chaotic mixing is terminated at a controlled stage of interpenetration of said major phase component and said at least one minor phase component and further, wherein the chaotic mixer is reversed in response to a measured increase in resistivity of the interpenetrating blend at an advanced stage of chaotic mixing whereby a controlled decrease in electrical resistivity is realized within said interpenetrating blend;

discharging said in-situ structured arrangement from said chaotic mixer in the form of a structured extrudate; and controlling forming said in-situ extrudate into a suitably solid multiple phase construction wherein said major phase component and said at least one minor phase component are arranged in interpenetrating blended relation.

18. A method for the manufacture of a multiple phase composite construction having a first phase polymeric component and a second phase polymeric component wherein said first and second phase polymeric components are in interpenetrating blended relation with one another, the method comprising the steps of:

supplying said first phase polymeric component to a chaotic mixer in a substantially controlled manner;

supplying said second phase polymeric component to said chaotic mixer in a substantially controlled manner;

chaotically mixing said first phase polymeric component with said second phase polymeric component within said chaotic mixer to yield an in-situ structured arrangement comprising an interpenetrating blend of said major phase component and said minor phase component;

controlling the chaotic mixing step such that the chaotic mixing is terminated at a controlled stage of interpenetration of said first phase polymeric component and said second phase polymeric component;

discharging said in-situ structured arrangement from said chaotic mixer in the form of a structured extrudate; and controllably forming said structured extrudate into a substantially solid multiple phase construction wherein said first phase polymeric component and said second phase polymeric component are disposed in interpenetrating blended relation wherein said first phase polymeric component and said second phase se polymeric are present at levels within said interpenetrating blend such that;

$$\frac{V_a \, \mu_b}{V_b \, \mu_a}$$

may not substantially equal 1 wherein,

Va is the volume percentage of said first phase polymeric component;

Vb is the volume percentage of said second phase polymeric component;

$\mu a$ is the viscosity of said first phase polymeric component during the chaotically mixing step; and $\mu b$ is the viscosity of said second phase polymeric component during the chaotically mixing step.

19. The method as recited in claim 18, wherein:

$$\frac{V_a}{V_b}\frac{\mu_b}{\mu_a}$$

is greater than about 2.

20. The method as recited in claim 18, wherein;

$$\frac{V_a}{V_b}\frac{\mu_b}{\mu_a}$$

is greater than about 5.

21. The method as recited in claim 18, wherein:

$$\frac{V_a}{V_b}\frac{\mu_b}{\mu_a}$$

is in the range of about 10 to about 140.

22. The method as recited in claim 18, wherein said first phase polymeric component is low density polyethylene and said second phase polymeric component is polystyrene.

23. A method for the manufacture of a multiple phase composite construction having a major phase component and at least one minor phase component arranged in a desired predefined morphological structure comprising a plurality of substantially discrete platelets, the method comprising the steps of:

supplying said major phase component to a chaotic mixer in a substantially controlled manner;

supplying said at least one minor phase component to said chaotic mixer in a substantially controlled manner;

chaotically mixing said major phase component with said at least one minor phase component within said chaotic mixer such that said major phase component and said at least one minor phase component form an in-situ structured arrangement formed progressively according to a preestablished and controllable evolutionary process, wherein said structured arrangement comprises a plurality of substantially discrete platelets of said major phase component and said at least one minor phase component;

controlling the chaotically mixing step such that the chaotic mixing is terminated at a controlled stage following formation of said substantially discrete platelets;

discharging said in-situ structured arrangement from said chaotic mixer in the form of a structured extrudate; and controllably forming said structured extrudate into a substantially solid structure having said defined morphological structure.

24. The method as recited in claim 23, wherein said major phase component comprises a polymeric material.

25. The method as recited in claim 24, wherein said at least one minor phase component comprises a polymeric material.

26. The method as recited in claim 23, wherein said major phase component comprises a non-polymeric viscous material.

27. The method as recited in claim 23, wherein said at least one minor phase component comprises a non-polymeric viscous material.

28. The method as recited in claim 23, wherein the chaotic mixing step is carried out as substantially two dimensional chaotic mixing.

29. The method as recited in claim 23, wherein the chaotic mixing step is carried out as substantially three dimensional chaotic mixing.

30. The method as recited in claim 23, wherein the chaotically mixing step comprises a plurality of substantially discrete controllable mixing stages of differing functionality to produce predetermined staged morphology changes within the group consisting of said major phase component and said at least one minor phase component.

31. The method as recited in claim 30, wherein the controlling step includes selectively varying the shear rate in the chaotic mixer at different stages during the chaotically mixing step.

32. The method as recited in claim 30, wherein the controlling step includes utilizing a selective combination of two dimensional chaotic mixing and three dimensional chaotic mixing.

33. The method as recited in claim 30, wherein the controlling step includes reversing the direction of mixing during the chaotically mixing step whereby structural morphology development is at least partially reversed such that the size of the platelets within the in-situ structured arrangement is increased.

34. The method as recited in claim 30, wherein said supplying steps and said discharging steps are carried out in a substantially continuous manner.

35. The method as recited in claim 23, wherein said multiple phase composite construction includes two or more minor phase components.

36. The method as recited in claim 23, wherein said multiple phase composite construction includes three or more polymeric constituents.

37. The method as recited in claim 23, wherein at least one of the group consisting of said major phase component and said at least one minor phase component includes an additive to reduce interfacial tension.

38. The method as recited in claim 23, wherein said major phase component is electrically conductive and said at least one minor phase component is substantially electrically non-conductive.

39. The method as recited in claim 23, wherein said major phase component is substantially electrically non-conductive and said at least one minor phase component is electrically conductive.

* * * * *

UNITED STATES PATENT AND TRADEMARK OFFICE
CERTIFICATE OF CORRECTION

PATENT NO.         : 6,770,340 B2
APPLICATION NO.    : 09/963983
DATED              : August 3, 2004
INVENTOR(S)        : David A. Zumbrunnen and Ojin Kwon It is certified that error appears in the above-identified patent and that said Letters Patent is hereby corrected as shown below:

In the specification,
Column 1, line 12 (insert prior to BACKGROUND OF THE INVENTION) -- This invention was made with government support under grant number NSF-9253640 awarded by the National Scientific Foundation. The government has certain rights in the invention. --

Signed and Sealed this
Twentieth Day of October, 2015

Michelle K. Lee
*Director of the United States Patent and Trademark Office*